United States Patent
Herz

(10) Patent No.: US 10,321,182 B2
(45) Date of Patent: *Jun. 11, 2019

(54) SYSTEM AND METHOD FOR REAL-TIME TRANSFER AND PRESENTATION MULTIPLE INTERNET OF THINGS (IOT) DEVICE INFORMATION ON AN ELECTRONIC DEVICE BASED ON CASTING AND SLINGING GESTURE COMMAND

(71) Applicant: DVDO, Inc., Santa Clara, CA (US)

(72) Inventor: William S Herz, Hayward, CA (US)

(73) Assignee: DVDO, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,787

(22) Filed: Sep. 13, 2017

(65) Prior Publication Data

US 2018/0077449 A1 Mar. 15, 2018

Related U.S. Application Data

(60) Provisional application No. 62/394,164, filed on Sep. 13, 2016.

(51) Int. Cl.
*H04N 21/40* (2011.01)
*H04N 21/41* (2011.01)
(Continued)

(52) U.S. Cl.
CPC ... *H04N 21/43615* (2013.01); *G06F 3/04883* (2013.01); *H04L 67/12* (2013.01);
(Continued)

(58) Field of Classification Search
None
See application file for complete search history.

(56) References Cited

U.S. PATENT DOCUMENTS

| 9,681,183 B1* | 6/2017 | Majid | H04N 21/440218 |
| 9,948,888 B1* | 4/2018 | Agarwal | H04N 7/147 |
| 2006/0020962 A1* | 1/2006 | Stark | G06F 17/30861 725/32 |
| 2009/0102983 A1* | 4/2009 | Malone | H04N 5/4403 348/734 |

(Continued)

*Primary Examiner* — Ricky Chin
(74) *Attorney, Agent, or Firm* — Invent Capture, LLC.; Samuel S. Cho

(57) ABSTRACT

A novel intermediary set-top box called a "cast-sling box" (CSB) uniquely incorporates multimedia and/or IoT data casting, slinging, transcoding, referring (i.e. referral mode), rendering, and recording capabilities for seamless interoperability of various electronic devices in a multiple device environment. The novel intermediary set-top box (i.e. "CSB") is also configured to perform a holistic-level device analysis on a plurality of IoT devices in a home or office environment. Furthermore, a holistic computerized user interface that can simultaneously and synergistically control and manage a multiple number of IoT devices is devised with the CSB as an intermediary set-top box. Moreover, a set of intuitive user gesture commands can be utilized in a direct peer-to-peer communication or in conjunction with the CSB as the intermediary set-top box, which enables simplified and seamless interoperability and multimedia data, control, and playback transfers among a plurality of electronic devices in a multiple display device environment.

11 Claims, 10 Drawing Sheets

An Example of a CSB Ecosystem with a Plurality of IoT Devices and Other Electronic Devices in a Home or Office Environment

(51) Int. Cl.
    *H04N 21/422*     (2011.01)
    *H04N 21/436*     (2011.01)
    *H04N 21/442*     (2011.01)
    *G06F 3/0488*     (2013.01)
    *H04N 21/472*     (2011.01)
    *H04L 29/08*     (2006.01)

(52) U.S. Cl.
    CPC ..... *H04N 21/4126* (2013.01); *H04N 21/4131* (2013.01); *H04N 21/422* (2013.01); *H04N 21/4222* (2013.01); *H04N 21/42202* (2013.01); *H04N 21/436* (2013.01); *H04N 21/44218* (2013.01); *H04N 21/47217* (2013.01)

(56) References Cited

U.S. PATENT DOCUMENTS

| | | | | |
|---|---|---|---|---|
| 2014/0109144 | A1* | 4/2014 | Asnis | H04N 21/43615 |
| | | | | 725/48 |
| 2015/0193069 | A1* | 7/2015 | Di Censo | G06F 3/017 |
| | | | | 345/173 |
| 2015/0286369 | A1* | 10/2015 | Pontual | G06F 3/04842 |
| | | | | 715/719 |
| 2016/0198229 | A1* | 7/2016 | Keipert | H04N 21/47217 |
| | | | | 725/12 |
| 2017/0150220 | A1* | 5/2017 | Greene | H04N 21/4622 |
| 2017/0195620 | A1* | 7/2017 | Gates | H04N 21/2343 |
| 2017/0208363 | A1* | 7/2017 | Glazier | H04N 21/41407 |
| 2017/0289614 | A1* | 10/2017 | VanBlon | H04N 21/43615 |
| 2018/0074594 | A1* | 3/2018 | Herz | H04N 21/42224 |
| 2018/0077442 | A1* | 3/2018 | Herz | G06F 3/04883 |
| 2018/0242033 | A1* | 8/2018 | Dimov | H04N 21/440236 |

\* cited by examiner

An Example of a CSB Ecosystem with a Plurality of IoT Devices and Other Electronic Devices in a Home or Office Environment

100

An Embodiment of a Sling / Cast Communication Environment with a CSB Connected to Localized IoT Devices and Consumer Electronic Devices (i.e. Sling / Cast Command User Devices)

200

An Embodiment of a Sling / Cast Communication Environment with a CSB Connected to Consumer Electronic Devices (i.e. Sling / Cast Command User Devices) and Wide-Area Networked (WAN), Cloud-Networked, and/or Non-Localized IoT Devices

300

An Embodiment of a Novel Cast/Sling Box (CSB) Board Block Diagram

400

An Embodiment of a Multiple Device Ecosystem with a CSB

500

An Embodiment of a System Software Stack for a Novel Cast/Sling Box (CSB)

600

Visual Representation of Sling and Cast Gesture Commands
and Execution Processes

700

An Embodiment of Cast/Sling Command Processing Modules in a Command-Initiating Device and a Novel Cast-Sling Box (CSB) for Intermediated Communication with IoT Devices

800

A Hardware Block Diagram Example of a Cast/Sling Command-Initiating or Cast/Sling Command-Receiving Device

900

An Embodiment of "Sling" Command Pathways for IoT Device Communication with End-User Devices via a Novel Cast-Sling Box (CSB)

1000

SYSTEM AND METHOD FOR REAL-TIME TRANSFER AND PRESENTATION MULTIPLE INTERNET OF THINGS (IOT) DEVICE INFORMATION ON AN ELECTRONIC DEVICE BASED ON CASTING AND SLINGING GESTURE COMMAND

BACKGROUND OF THE INVENTION

The present invention generally relates to electronic sensor and device information sharing and transfers. More specifically, the invention relates to one or more systems and methods for real-time transfer and presentation of Internet-of-Things (IoT) device information based on casting and slinging gesture command Moreover, the invention also relates to transferring, streaming, authorizing, rendering, and recording sensory, device status, multimedia, and hardware configuration information between IoT devices and consumer electronic devices.

Furthermore, the invention also relates to a novel multimedia set-top box configured to accommodate multimedia, device, and/or sensory information sharing and transfers. In addition, the invention also relates to a method of determining an electronic information transfer target device when one or more novel multimedia set-top boxes are operating together with a plurality of potential transfer target devices.

Various consumer electronic devices in today's digital age are capable of downloading, executing, or uploading multimedia information. For example, smart phones, tablet computers, notebook computers, and Internet-connected "smart" televisions in recent years are frequently utilized for video and audio download, upload, and playback in a broadband data network-connected environment. As more consumers own and simultaneously operate a plurality of multimedia data-executable electronic devices in a typical home or office environment, seamless, immediate, and convenient multimedia data transmission, reception, recording, playback authorizations, and playback among the consumer's plurality of multimedia data-executable electronic devices are increasingly becoming more important and desirable.

Furthermore, in recent years, kitchen appliances, indoor HVAC (heating, ventilating, and air conditioning) controls, environmental sensors, lighting controls, door lock/unlock controls, building security systems, and other electronic appliances are becoming increasingly connected to broadly-compatible electronic information networks, such as the Internet, another wide-area network (WAN), and/or a local-area network (LAN), to communicate with other electronic devices. These "connected" devices in today's electronics industry are known as "Internet-of-Things" (IoT) devices.

Unfortunately, a satisfying level of seamless, immediate, and convenient multimedia and IoT device data sharing and playback interoperability among various electronic devices in a real-life home or office environment is difficult to achieve due to various factors. For example, different or incompatible manufacturer specifications, operating systems, application programming interfaces (API's), and applications can make interoperability of various IoT and multimedia devices difficult. Moreover, system software or communication protocol incompatibilities among various electronic devices, misconfigured digital rights management (DRM) programs, and hardware incompatibilities among a plurality of electronic devices often prevent seamless and immediate sharing, streaming, rendering, and playback of multimedia or IoT device data among various devices that a consumer operates in today's home or office environment.

Furthermore, conventional user command methods and user interfaces for transmitting or receiving multimedia and/or IoT device data from one device to another in today's home or office environment typically require fidgeting with both transmitting and receiving devices and various device settings to establish interoperable data communications. A cumbersome current state of the art in configuring the multiple device interoperability discourages a typical consumer from making any available multimedia playback devices and/or IoT devices fully interoperable in a typical home or office environment. In addition, conventional IoT device management and control interfaces tend to be separate computerized applications for each IoT device, thus making a holistic and simultaneous control and management of multiple IoT devices difficult.

Therefore, it may be advantageous to devise a novel intermediary set-top box that can provide seamless, immediate, and convenient interoperability and data transfer among a plurality of electronic devices in a heterogeneous multimedia and IoT device environment. In addition, it may be advantageous to devise the novel intermediary set-top box that can perform a holistic-level device analysis on a plurality of IoT devices in a home or office environment.

Moreover, it may also be advantageous to devise a system and a related method for real-time IoT device data transfer and presentation of IoT device information via intuitive user gesture commands. In addition, it may be advantageous to devise a holistic computerized user interface that can simultaneously and synergistically control and manage a multiple number of IoT devices.

Furthermore, it may also be advantageous to devise a method of determining an IoT or multimedia or IoT content transfer target device, when one or more novel intermediary set-top boxes are operating together with a plurality of potential transfer target devices for multimedia or device data sharing in a home or office environment.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an electronic system for real-time transfer and presentation of multiple Internet-of-Things (IoT) device information based on slinging and casting gesture commands is disclosed. This electronic system comprises: an IoT device configured to control, determine, record, or display an environmental variable; a cast-sling box (CSB) containing a CPU or an APU, a memory unit, and at least one of a wireless LAN chipset, PCIe and PCM interfaces, a WiGig module connected to a PCIe interface, an audio codec connected to a USB interface, an IR blaster unit connected to a GPIO interface, an HDMI bridge unit for wireless HDMI input receivers, a voltage regulator, and a power supply; a cast and sling processing module executed and operated by a gesture-based multimedia casting and slinging command device or by the CSB, wherein the cast and sling processing module incorporates a user gesture interpreter, a user gesture command receiver, a sling gesture command encoder, and a cast gesture command encoder, wherein the user gesture interpreter determines a user's finger swipe gesture as an IoT device sling command involving an inbound IoT device control, content, or sensory value readout transfer from the IoT device to the gesture-based multimedia casting and slinging command device intermediated by the CSB, or as an IoT device cast command involving an outbound content or command transfer from the gesture-based multimedia casting and slinging command device to the IoT intermediated by the CSB; the sling gesture command encoder configured to encode the IoT device sling command as an inbound IoT device control, content, or sensory value readout transfer request to the IoT device via the CSB for a localized control and playback at the gesture-based multimedia casting and slinging command device; and the cast gesture command encoder configured to encode the IoT device cast command as an outbound content or command transfer request from the gesture-based multimedia casting and slinging command device to the IoT device via the CSB for a remote playback at the IoT device.

DETAILED DESCRIPTION

Figure 1:
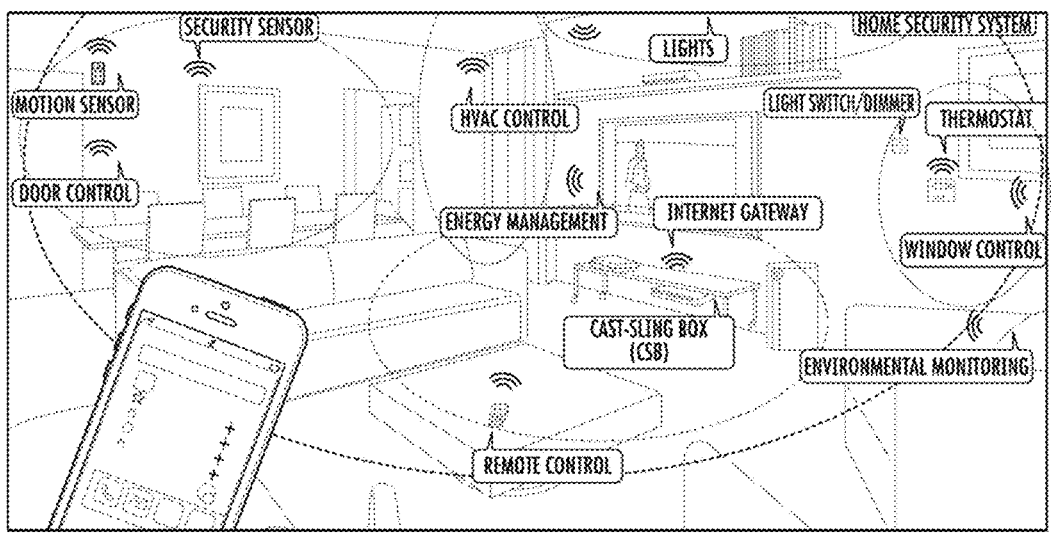
FIG. 1 shows an example of a novel cast-sling box (CSB) ecosystem with a plurality of IoT devices and other electronic devices in a home or office environment, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble one or more systems and methods for real-time transfer and presentation of IoT device information based on casting and slinging gesture commands. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term referred to as "cast," or "casting," is defined as an act of transmitting or "pushing" a multimedia or IoT content (e.g. audio, video, photo, computer-generated graphics, screen mirroring, user interface, etc.), sensor readout values, and/or IoT device-related information from one electronic device to another electronic device. Furthermore, a "casting" device is defined as an electronic device executing a multimedia or IoT data transmission application for sending multimedia or IoT data to another electronic device, which is configured to receive, playback, render, and/or record the transmitted multimedia or IoT content or IoT data. In a preferred embodiment of the invention, a casting command and a corresponding multimedia or IoT data transmission process are executed in a mobile operating system (e.g. Android, iOS, etc.) environment or a computer operating system (e.g. Windows, Mac OS X, Chrome OS, etc.) environment. In one embodiment, casting can accommodate real-time outbound streaming of multimedia or IoT data to a targeted electronic device for immediate playback or recording. In another embodiment, casting can accommodate an outbound file transfer to the targeted device.

Moreover, for the purpose of describing the invention, a term referred to as "sling," or "slinging," is defined as an act of requesting, "pulling," receiving, and/or rendering a multimedia or IoT content (e.g. audio, video, photos, computer-generated graphics, etc.), sensor readout values, and/or IoT device-related information from a targeted electronic device. Furthermore, a "slinging" device is defined as an electronic device executing a multimedia or IoT device data playback and/or readout application that requests, receives, plays, or reads out a multimedia or IoT device data content, which is transmitted from another electronic device after an on-demand request by a user. In a preferred embodiment of the invention, a slinging command and corresponding multimedia or IoT data request, receipt, and rendering processes are executed in a mobile operating system (e.g. Android, iOS, etc.) environment, a computer operating system (e.g. Windows, Mac OS X, Chrome OS, etc.) environment, or a server/cloud environment. In one embodiment, slinging can accommodate real-time streaming-in of multimedia or IoT data from a content source device for immediate playback or recording in a sling-initiating device. In another embodiment, slinging can accommodate file transfer-in from the content source device.

In addition, for the purpose of describing the invention, a term referred to as "cast-sling box," or "CSB," is defined as a novel electronic set-top box configured to provide at least three primary functions in a single set-top box unit: casting, slinging, and digital recording with full-duplex time shifting (i.e. concurrent independent recording and playback). In a preferred embodiment of the invention, a CSB is configured to act as an intermediary device among a variety of electronic devices for seamless, immediate, and convenient device interoperability in casting, slinging, displaying, and recording multimedia or IoT device data. In some instances, the CSB is also configured to transcode multimedia data to provide seamless multimedia or IoT device data format compatibility among the variety of electronic devices.

Yet in some other instances, the CSB provides a novel feature called "referral mode," which is configured to overcome inter-device multimedia or IoT content transfer restrictions often imposed by a DRM by incorporating an automated and seamless capability to log into a user's DRM-authorized online content service account upon a user's inter-device content transfer request (e.g. a cast or sling request), and then streaming-in or downloading the DRM-authorized content directly from the online content service provider to the CSB over the Internet or another cloud-based wide-area network (WAN). The CSB can then fulfill the user's inter-device content transfer request by directing the streamed-in or downloaded DRM-authorized content to a target device. In some embodiments, IoT data contents may include video, audio, graphics, or other multimedia information from a video surveillance camera, a home security system, a camera-equipped IoT refrigerator, or another IoT device, wherein the IoT data contents are subject to DRM restrictions, hack-prevention security restrictions, data authentication, and encryption.

Furthermore, the "referral mode" may also be utilized to accommodate seamless communication among an IoT device (e.g. a Nest device or sensor), an IoT device online access account (e.g. a Nest app, a Nest online device control account, etc.), and a user's consumer electronic device (e.g. a smart phone, a tablet computer, etc.) that are intermediated by the CSB. In such instances, the CSB can automatically and seamlessly log into the IoT device online access account and transfer information between the IoT device online access account and the CSB, which in turn transmits user-requested IoT information to the user's consumer electronic device. The user's consumer electronic device, in turn, can automatically launch a corresponding IoT mobile application to view and control the IoT device as a result of the communication with the CSB.

Examples of electronic devices that can be connected to and intermediated by the CSB include, but are not limited to, IoT devices, a smart phone, a tablet computer, a notebook computer, a wearable electronic device, an optical disc player (e.g. a Blu-ray or DVD player), a cable TV or satellite TV set-top box, a game console, and a conventional media storage and playback device (e.g. a time-shifting module integrated into or connected to a television). Furthermore, examples of IoT devices include, but are not limited to, kitchen appliances (e.g. refrigerators, toasters, microwave ovens, etc.), laundry machines, HVAC controllers, environmental sensors (e.g. light sensors, motion sensors, temperature sensors, gas leak sensors, etc.), lighting units, door or window controllers, home security systems, and door lock/unlock controllers. IoT home security systems, surveillance cameras, microphones, camera-embedded refrigerators, or other IoT devices may be configured to transfer video, audio, graphics, or other multimedia data via the CSB to an end-user electronic device that requested such multimedia data from one or more IoT devices. IoT devices may also be configured to receive and respond to device settings change commands, sensor readout commands, or other device parameter-altering or data retrieval commands from the end-user electronic device via the CSB.

Furthermore, for the purpose of describing the invention, a term "cloud," "cloud network," or "cloud computing" is defined as a data network environment in which data from an electronic system operatively connected to the data network environment is typically stored in a network-attached storage, instead of a local storage of the electronic system. In one example, the data from the electronic system may be stored in both the local storage of the electronic system as well as the network-attached storage by default. In another example, the data from the electronic system may only be stored in the network-attached storage by default without storing any data permanently in the local storage of the electronic system, other than utilizing a temporary local buffer of the electronic system.

Moreover, for the purpose of describing the invention, a term "electronic system" is defined as an electronic-circuit hardware device such as a computer system, a computer server, a multimedia information-processing set-top box, a handheld device (e.g. a cellular phone, a tablet computer, a portable gaming device, etc.), a wearable electronic device (e.g. an electronic goggle with an embedded display, an implantable electronic device, other sensors, etc.), a visual monitoring system, an IoT device, or another electronic-circuit hardware device.

In general, one or more embodiments of the invention relate to systems and methods that can provide seamless interoperability, content sharing, and transfer among a plurality of electronic devices, which include multimedia and IoT devices. More specifically, one or more embodiments of the invention relate to a novel intermediary set-top box configured to cast, sling, transcode, render, and record various multimedia or IoT device data for seamless interoperability of various electronic devices. Furthermore, some embodiments of the invention relate to a novel intermediary set-top box configured to time-shift, transfer, IoT-trigger, and process sensor data with a resulting action.

In addition, some embodiments of the invention relate to user control interfaces for initiating and processing multimedia or IoT data among a plurality of electronic devices. More specifically, one or more embodiments of the invention relate to providing gesture-based multimedia or IoT data casting and slinging command methods in an interoperable multiple device environment.

Furthermore, some embodiments of the invention relate to electronic systems that execute user gesture-based multimedia casting and slinging commands in an interoperable multiple device environment involving consumer electronic devices and IoT devices. A preferred embodiment of the invention may include a novel cast-sling box that acts as an intermediary device for seamless multimedia and/or IoT data transfer and playback interoperability among a plurality of electronic devices.

An objective of an embodiment of the present invention is to provide a novel intermediary set-top box called a "cast-sling box" (CSB) that uniquely incorporates multimedia and/or IoT data casting, slinging, transcoding, referring (i.e. referral mode), rendering, and recording capabilities for seamless interoperability of various electronic devices in a multiple device environment.

Another objective of an embodiment of the present invention is to provide a novel intermediary set-top box (i.e. "CSB") that can perform a holistic-level device analysis on a plurality of IoT devices in a home or office environment.

Yet another objective of an embodiment of the present invention is to provide a method of determining a multimedia or IoT content transfer target device when one or more cast-sling boxes are operating together with a plurality of potential transfer source and target devices.

Yet another objective of an embodiment of the present invention is to provide a holistic computerized user interface that can simultaneously and synergistically control and manage a multiple number of IoT devices.

Yet another objective of an embodiment of the present invention is to provide a set of intuitive user gesture commands executed on an electronic device that enable simplified and seamless interoperability and multimedia data transfers among a plurality of electronic devices in a multiple device environment.

FIG. 1 shows an example of a novel cast-sling box (CSB) ecosystem (100) with a plurality of IoT devices and other electronic devices in a home or office environment, in accordance with an embodiment of the invention. In this example, a CSB is operatively connected to a home Internet gateway (i.e. an Internet router), consumer electronic devices such as a smart television and a smart phone, and Internet-of-Things (IoT) devices such as an environmental monitoring sensor (e.g. a security sensor, a motion sensor, a temperature sensor), a window controller, a thermostat, a HVAC controller, a lighting controller, a light assembly, a home security system, a TV remote controller, and a door lock/unlock controller, as shown in FIG. 1. The CSB and each of the connected electronic devices are configured to transmit or receive multimedia or IoT-related data when an end-user device initiates a sling or cast command Typical end-user devices that initiate sling or cast command may be smart phones, tablet computers, notebook computers, or other electronic devices connected to the CSB with sling or cast command-initiating capabilities.

For example, a user's finger swipe command on a smart phone via a CSB-commanding mobile application user interface may be an IoT device data "sling" command, which is initially transmitted to the CSB. Then, the CSB relays, converts, and/or transcodes the IoT device data sling command while ensuring protocol compatibility with the home security system, and then transmits the relayed, converted, and/or transcoded IoT device data sling command to the home security system. If the home security system acknowledges the command and decides to authorize real-time data streaming or transfer between itself and the smart phone, then the CSB begins to intermediate data streaming or transfer between the home security system and the smart phone. In one instance, the home security system may provide real-time streaming video footages from one or more security cameras connected to the home security system, which are relayed, converted, and/or transcoded by the CSB to ensure compatibility and then transmitted to the smart phone for playback or recording.

In another instance, the home security system may transfer historical security alarm information (e.g. motion sensor trigger history, opened door/windows detection history, fault password entry history, etc.) to the smart phone via the CSB. Furthermore, in this example, the smart phone is also capable of sending a cast command or a device control command to the home security system via the CSB to adjust or reprogram security alarm sensitivity and other device settings parameters. In other instances, the cast command may be utilized to send multimedia or IoT data from the smart phone to the home security system for rendering, display, playback, and/or recording by the home security system. Moreover, even though the home security system has been described above as an example of IoT device sling or cast communication with an end user device (i.e. the smart phone) via the CSB, other IoT devices can also be configured to communicate with one or more end-user devices, in accordance with various embodiments of the invention.

Figure 2:
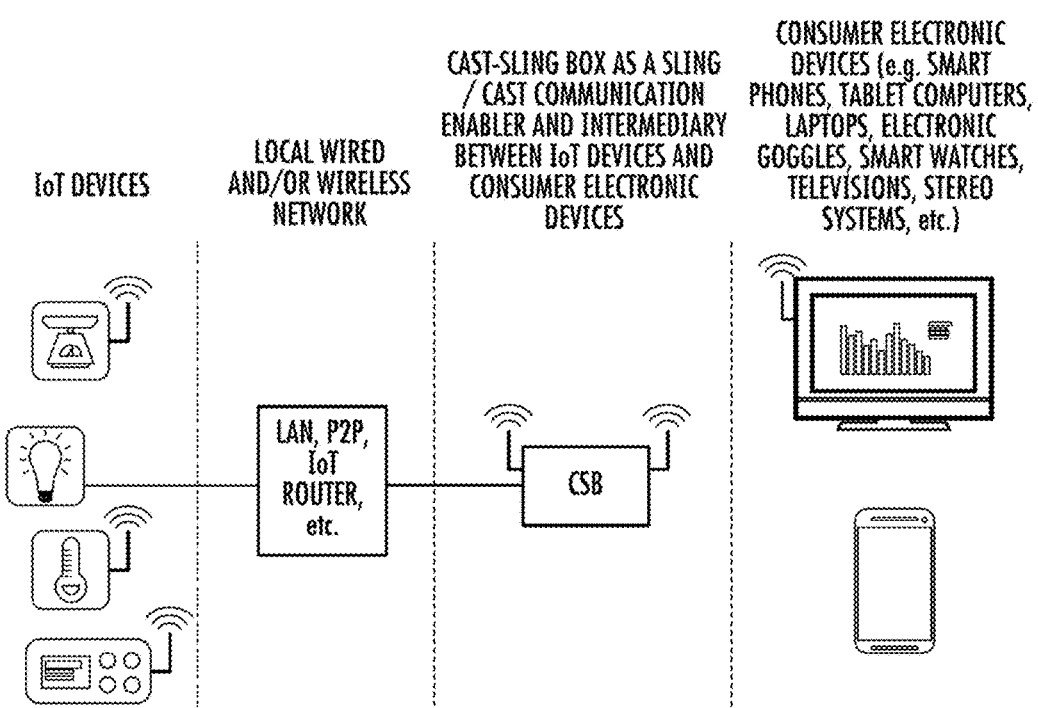
FIG. 2 shows an embodiment of a sling and/or cast communication environment with a novel cast-sling box (CSB) connected to localized IoT devices and sling/cast command user devices, in accordance with an embodiment of the invention.

FIG. 2 shows an embodiment of a sling and/or cast communication environment (200) with a novel cast-sling box (CSB) connected to a plurality of local IoT devices and consumer electronic devices (i.e. sling/cast command user devices), in accordance with an embodiment of the invention. As shown by FIG. 2, the local IoT devices (e.g. a weight scale, a light bulb, a thermometer, an HVAC controller) are connected to a local wired and/or wireless network, which may also incorporate one or more network routers. In the embodiment of the invention as shown in FIG. 2, the local IoT devices are typically present in close proximity to one or more CSB's in one building or in one location for extensive utilization of the same local wired and/or wireless network. The local wired and/or wireless network is further connected to a cast-sling box (CSB) that functions as a sling or cast communication enabler and as an intermediary machine between the local IoT devices and consumer electronic devices. Furthermore, the local wired and/or wireless network may also be connected to a wide-area network, such as the Internet, for external electronic communications outside of the local wired and/or wireless network. In an alternate embodiment of the invention, one or more local IoT devices may be directly connected to the CSB through a physical cable or a peer-to-peer (P2P) wireless protocol.

As shown in the sling and/or cast communication environment (200) of FIG. 2, the consumer electronic devices are operatively connected to the CSB through the local wired and/or wireless network, another data network, or a peer-to-peer (P2P) direct wired or wireless connection. Types of consumer electronics devices that are connected to the CSB may include, but are not limited to, smart phones, tablet computers, laptops, electronic goggles, smart watches, televisions, and stereo systems. The sling and/or cast communication environment (200) in this embodiment forms a CSB-intermediated pathway of sling and cast-related communication between each consumer electronic device and each IoT device via the CSB, which is capable of relaying, converting, and/or transcoding commands, multimedia, or IoT device data formats to provide interoperable communication compatibility between each consumer electronic device and each IoT device.

In a preferred embodiment of the invention, a consumer electronic device, such as a smart phone, a tablet computer, a laptop, a smart watch, and a television, is capable of issuing sling or cast commands to one or more IoT devices via the CSB. When a user issues a sling command to a targeted IoT device (i.e. through a gesture command or another user command method on the consumer electronic device), the user is attempting to receive or "pull" sensory, hardware device settings information, or other device-related information from the targeted IoT device. The CSB receives the sling command first from the consumer electronic device, and if necessary, converts and/or transcodes the sling command to a data format compatible to the targeted IoT device. The sling command is then further transmitted (i.e. relayed) to the targeted IoT device. Upon receipt of the sling command, the targeted IoT device transmits or streams requested IoT data to the CSB, which in turn converts and/or transcodes, if necessary, the requested IoT data to a new data format to ensure data format and protocol compatibility with the consumer electronic device. The CSB then further transmits and/or streams the requested IoT data (e.g. sensor readout values, IoT device settings information, multimedia content, current device status, other device-related parameters, etc.) to the consumer electronic device.

Depending on data security, authentication, and encryption implementations associated with the targeted IoT device, the CSB, and the consumer electronic device, the targeted IoT device may first need to verify the validity of the incoming sling command before deciding to allow or refuse transmission of the requested IoT data to the CSB. Furthermore, depending on encryption and decryption policies associated with the targeted IoT device, the CSB, and the consumer electronic device, the CSB may provide data encryption or decryption to incoming and outgoing data packets between the consumer electronic device and the targeted IoT device for slinging operations.

Furthermore, if the user issues a cast command to a targeted IoT device (i.e. through a gesture command or another user command method on the consumer electronic device), the user is attempting to transmit, stream, and/or "push" an IoT device settings-changing command or a multimedia content to the targeted IoT device. The CSB receives the cast command first from the consumer electronic device, and if necessary, converts and/or transcodes the cast command to a data format compatible to the targeted IoT device. The cast command is then further transmitted (i.e. relayed) to the targeted IoT device. In one embodiment, the targeted IoT device may adjust its hardware settings upon receipt of the cast command For example, the targeted IoT device may adjust its sensor sensitivity, its camera angle, its HVAC temperature setting, its power conservation mode, or another aspect of its device settings parameter. In another embodiment, the targeted IoT device may record, render, and/or playback the multimedia content casted (i.e. transmitted or streamed) from the consumer electronic device via the CSB's real-time intermediation.

When a plurality of casted or slinged contents are transferred, processed, and displayed by one or more electronic devices, it becomes visually difficult for the user to track or intuitively recognize the origin of each casted or slinged content. The user may also be confused as to what is being casted and what is being slinged on a display panel. The confusion may be even more pronounced if a multiple number of users is concurrently engaged in casting and slinging of multimedia or IoT data to one or more display panels.

Therefore, in a preferred embodiment of the invention, when a casted or slinged content (e.g. video, graphics, photos, IoT data, etc.) is displayed on a display panel of an end-user device, a window frame that encapsulates the casted or slinged content in the end-user device can be dynamically color-coded to match the window frame color of the content source device. If a CSB is intermediating transmission of the content and is also displaying the content on a separate display panel connected to the CSB, then the window frame encapsulating the casted or slinged content on the separate display panel is also color-coded to match the window frame color of the content source device.

Furthermore, a displayed audio mixer interface that can be associated with a plurality of window frames for a plurality of casted or slinged contents can be dynamically color-coded during its operation to match a particular window frame color that encapsulates a content currently undergoing audio and/or volume adjustment.

In one preferred method of dynamic window frame coloring implementation for casted or slinged contents among a plurality of electronic devices, assigning colors to URL's and rendering them at the graphics engine for both the end-user device and the CSB may be desirable. Furthermore, the color palette can be monitored to ensure that each colored window frame matching for each casted or slinged content remains unique to one particular color. If casting or slinging of a particular content is terminated, then a particular color that was previously assigned to the casting or the slinging of the particular content can be recycled into a fresh color palette pool for future color-coding assignments to future casting or slinging activities.

Depending on data security, authentication, and encryption implementations associated with the targeted IoT device, the CSB, and the consumer electronic device, the targeted IoT device may first need to verify the validity of the incoming cast command before deciding to allow or refuse further processing of the cast command on the targeted IoT device. Furthermore, depending on encryption and decryption policies associated with the targeted IoT device, the CSB, and the consumer electronic device, the CSB may provide data encryption or decryption to incoming and outgoing data packets between the consumer electronic device and the targeted IoT device for casting operations.

Figure 3:
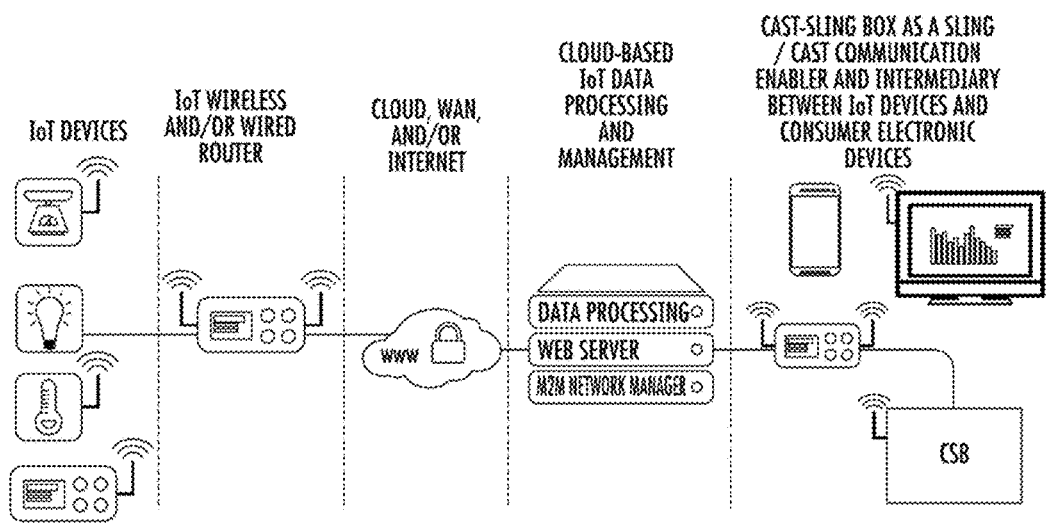
FIG. 3 shows an embodiment of a sling and/or cast communication environment with a novel cast-sling box (CSB) connected to sling/cast command user devices and wide-area networked (WAN), cloud-networked, and/or non-localized IoT devices, in accordance with an embodiment of the invention.

FIG. 3 shows an embodiment of a sling and/or cast communication environment (300) with a novel cast-sling box (CSB) connected to consumer electronic devices (i.e. sling/cast command user devices) and wide-area networked (WAN), cloud-networked, and/or non-localized IoT devices, in accordance with an embodiment of the invention. As shown by FIG. 3, the IoT devices (e.g. a weight scale, a light bulb, a thermometer, an HVAC controller) are connected to a wireless and/or wired router that supports communication with IoT devices. The wireless and/or wired router is further connected to the Internet or another wide-area network (WAN), which enables cloud-based IoT data processing and management by a cloud-based IoT data processing and management service provider. In this embodiment, the IoT devices do not have to be placed in close proximity to the CSB or to the consumer electronic devices, and may be remotely located without any limitation to physical distances from the CSB or the consumer electronic devices, as long as they are operatively connected to the CSB by one or more wide-area networks. In other embodiments of the invention, some IoT devices may be connected to the CSB via a local area network (LAN), while other IoT devices are connected to the CSB via the Internet or another wide area network.

Moreover, the cloud-based IoT data processing and management service provider may categorize, archive, and maintain IoT device data periodically or in real time, and further provide a web-based IoT data access to the CSB via the Internet or another wide-area network, as shown in FIG. 3. The CSB is further configured to receive and process sling or cast commands issued by each consumer electronic device to a targeted IoT device remotely connected through the Internet or another wide-area network. As shown in the sling and/or cast communication environment (300) of FIG. 3, the consumer electronic devices are operatively connected to the CSB through a wired and/or wireless network, another data network, or a peer-to-peer (P2P) direct wired or wireless connection. Types of consumer electronics devices that are connected to the CSB may include, but are not limited to, smart phones, tablet computers, laptops, electronic goggles, smart watches, televisions, and stereo systems.

The sling and/or cast communication environment (300) in this embodiment forms a CSB-intermediated and WAN-based pathway of sling and cast-related communication between each consumer electronic device and each IoT device via the CSB, which is capable of relaying, converting, and/or transcoding commands, multimedia, or IoT device data formats to provide interoperable communication compatibility between each consumer electronic device and each IoT device. Furthermore, in some embodiments of the invention, the CSB is also configured to communicate sling or cast commands and related operations with each non-localized IoT device indirectly via a web-based IoT data access service, which is hosted by the cloud-based IoT data processing and management service provider, as shown in FIG. 3.

Furthermore, in some embodiments of the invention, the CSB provides a novel feature called "referral mode" that can seamlessly assist indirect streaming or transfer of IoT and/or multimedia data between a sling or cast command-issuing device (e.g. a consumer electronic device) and a sling or cast-targeted device (e.g. an IoT device) without a direct streaming exchange between the two devices. The referral mode may be particularly useful if a particular content desired for slinging is restricted from device-to-device streaming by a DRM rule associated with the particular content. When the referral mode is enabled, the CSB is uniquely configured to overcome inter-device multimedia or IoT content transfer restrictions (i.e. often imposed by a DRM) by logging into a user's DRM-authorized online content service account upon a user's slinging request, and then streaming-in or downloading the DRM-authorized content directly from the online content service provider to the CSB over the Internet or another cloud-based wide-area network (WAN). Preferably, the CSB carries a particular pointer location or another content-identifying information associated with the online content service provider to ensure that the streaming-in/downloading content is identical to the particular content desired by the user for slinging. The CSB can then fulfill the user's sling request to the sling-requesting device (i.e. a consumer electronics device) by directing the streamed-in or downloaded DRM-authorized content to the sling-requesting device. Preferably, user login ID's, passwords, and other credentials necessary for logging into the user's DRM-authorized online content service account are inputted by the user and configured during an initial device setup stage between the sling-source device (i.e. an IoT device) and the CSB. Entering the referral mode-related user credential information at the initial device setup stage enables the CSB's log-in into the user's DRM-authorized online content service account to be automated, seamless, and potentially invisible to the user, whenever the referral mode is necessary or preferred for fulfilling a slinging operation due to DRM restrictions.

In addition, the referral mode can also be utilized for alternative sourcing of multimedia or IoT contents via a cloud content provider. For example, when a user requests a particular multimedia or IoT content from a sling-source device to be slinged to a sling-requesting device via a CSB, the referral mode enables the CSB to find and retrieve another instance of the same multimedia or IoT content from a cloud-networked content provider. Then, the CSB can seamlessly stream-in or download the same multimedia or IoT content from the cloud-network content provider, and subsequently transmit the streamed-in or downloaded multimedia or IoT content to the sling-requesting device, without a direct and localized streaming exchange between the sling-source device and the sling-requesting device. Preferably, the CSB carries a particular pointer location or another content-identifying information associated with the cloud content provider to ensure that the streaming-in/downloading content is identical to the particular content desired by the user for slinging. The CSB can then fulfill the user's sling request to the sling-requesting device by directing the alternatively-sourced multimedia or IoT content to the sling-requesting device.

In one embodiment, an identification marker for the intended target device may be embedded in the sling request originating from the sling command-initiating device. In an alternate embodiment, the CSB may independently determine the intended target device based on user preferences settings or sling-priority device lists. For example, if the user preference settings is set to an intelligent "slingable" content search mode, the CSB may proactively search for the particular multimedia or IoT content selected and requested by the user in a variety of multimedia devices connected to the CSB. If the particular multimedia or IoT content is found only in one particular device, then the CSB can set that one particular device as the intended target device and accommodate multimedia or IoT content sling operations from the one particular device to the sling command-initiating device. On the other hand, if the particular multimedia or IoT content is found in a plurality of devices connected to the CSB, then the CSB may autonomously (i.e. without further direct input from the sling command-initiating device) select one device as the intended target device based on the current level of data traffic congestion and hardware utilization among the plurality of sling-eligible devices. Preferably, the device selected in this manner has the lowest current level of data traffic congestion and hardware utilization, so that the sling operation is most efficiently performed between the intended target device and the sling command-initiating device.

In another example, if a user preference setting defines the intended target device for slinging to be a geographically-nearest device relative to a CSB, or a largest multimedia or IoT content storage device connected to the CSB, then the CSB can relay the sling command to the geographically-nearest display device or to the largest multimedia or IoT content storage device. If the intended target device approves the sling request, then a particular multimedia or IoT content desired by the user of the sling command-initiating device can be transmitted as a real-time stream to the sling command-initiating device via the CSB. Then, the sling command-initiating device can locally render and/or record the "slinged-in" multimedia or IoT data stream with intermediary assistance from the CSB.

Furthermore, the CSB is capable of servicing one-to-one as well as one-to-many sling or cast requests for various and customized time-shift playback points by one or more sling-requesting devices. For example, the CSB may buffer or store a user-selected "slingable" content received from a sling source device, and then transmit the user-selected "slingable" content to a plurality of sling-requesting devices at various user-selected time-shift playback points that are specified by a plurality of users who are operating the plurality of sling-requesting devices. Moreover, a particular user's action to pause, rewind, or fast-forward the user-selected "slingable" content (e.g. from an IoT security camera, etc.) during playback does not impact another user's action to pause, rewind, or fast-forward the same content, because each user is controlling an individual user-specific instance of the same content provided by the CSB.

Examples of intermediary assistance from the CSB include, but are not limited to, transcoding, up-converting, down-converting, and/or reformatting multimedia or IoT data streams for seamless data format compatibility between a multimedia or IoT content sling requester (e.g. the sling command-initiating device) and a sling-targeted device that subsequently transmits a selected multimedia or IoT content to the multimedia or IoT content sling requester via the CSB. Moreover, in some embodiments, the multimedia or IoT content sling requester may send a plurality of multimedia or IoT data sling requests to a plurality of intended target devices to simultaneously receive, render, and/or record a multiple number of multimedia or IoT contents on its display and/or in its local data storage.

In some embodiments of the invention, the CSB is also capable of enhancing audio and/or video quality of an incoming multimedia or IoT content using various noise-filtering schemes and/or up-conversion processing methods, if the quality improvements are technically feasible and desirable for the incoming multimedia or IoT content. In such instances, the CSB transcodes and/or filters the incoming multimedia or IoT content from a sling source device to improve audio and/or video quality first, and then transmits the quality-improved multimedia data streams to one or more sling-destination devices.

Furthermore, in the preferred embodiment of the invention, the CSB's digital video recording capabilities may include "bookmarking," "slingburst," and "frame capture." In context of the CSB's feature set, a "bookmarking" feature refers to empowering a user to bookmark multiple "in" and "out" points to define one or more multimedia or IoT content segments prior to slinging of corresponding multimedia or IoT contents to a sling receiver (i.e. a sling command-initiating device), which subsequently renders and/or stores the corresponding multimedia or IoT contents in real time. Bookmarking may be performed entirely or partially by the CSB, and the CSB may process the entire data stream or merely a metadata subset (e.g. "edit decision list") of the data stream. The metadata subset, which contains the edit decision list, can then be utilized by an end-user device or by the CSB to edit one or more multimedia content segments. In addition, a "slingburst" feature refers to transmission and recording of a multimedia or IoT content to the sling receiver at a current maximum-available speed of a home or office data network without being limited to an underlying bitrate of encoding, real-time streaming, rendering, and playback of the multimedia or IoT content. Moreover, a "frame capture" feature refers to photo-capturing of a user-specified still video frame via a real-time user command or pausing of a video stream accommodated by the CSB. The captured photo can be stored locally as a JPEG file or as another graphics file in the CSB or in any of the user's cast or sling command-initiating device. Furthermore, the captured photo can also be printed as a paper copy or a soft electronic copy from the CSB.

Figure 4:
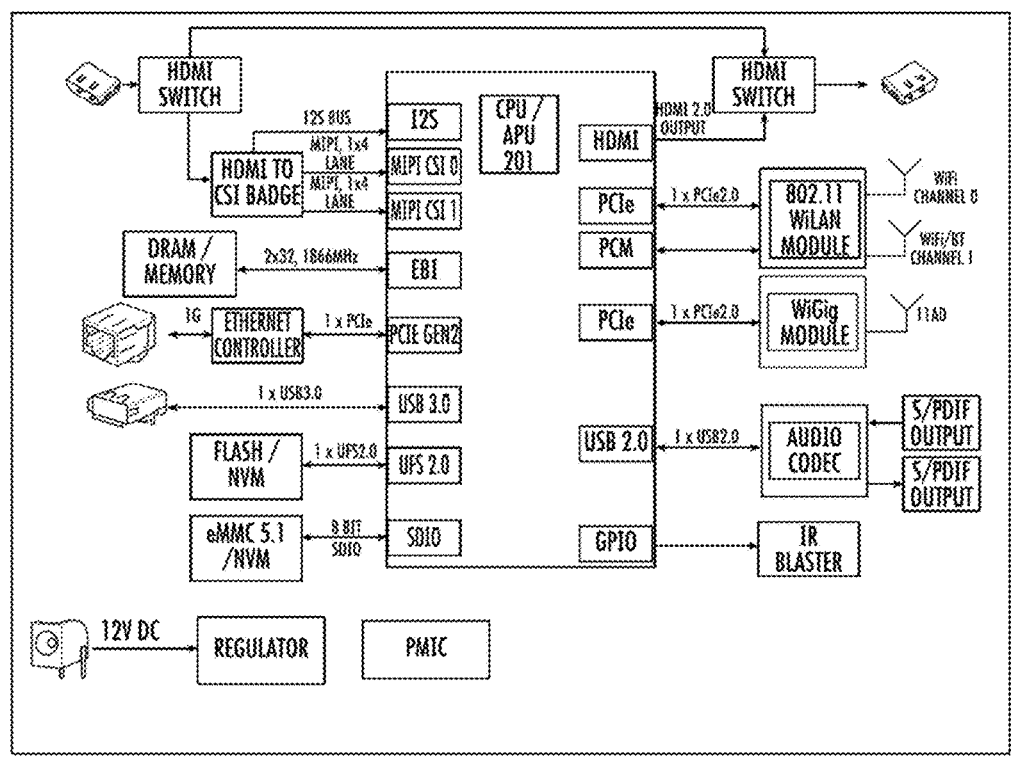
FIG. 4 shows an embodiment of a novel cast-sling box (CSB) board block diagram, in accordance with an embodiment of the invention.

FIG. 4 shows an example of a novel cast-sling box (CSB) board block diagram (400), in accordance with an embodiment of the invention. In this example, a CPU (central processing unit) or an APU (application processor unit) is configured to control a variety of hardware interfaces for multimedia input/output ports and other logical units utilized in functioning of the CSB. The APU, for example, can be a high-performance application processor such as Qualcomm APQ 8096. In the example shown in FIG. 4, the APU is connected to a 802.11 wireless LAN chipset via PCIe and PCM interfaces, a WiGig module via a PCIe interface, an audio codec via a USB 2.0 interface, an IR blaster unit via a GPIO interface, and an HDMI bridge unit via a MIPI CSI interface for external HDMI input solutions, such as one or more wireless HDMI input receivers. The APU is also connected to a variety of USB and other data input/output interfaces, and receives electric power via a power supply and a voltage regulator, as also shown in FIG. 4.

In a preferred embodiment of the invention, the CSB is a set-top box located in a multiple device home or office environment, wherein the CSB operates as an intermediary unit that connects to various display devices and other electronic systems to accommodate seamless multimedia or IoT content sharing, transfer, playback, and recording interoperability. Connection to various display devices and other electronic systems may involve wireless and/or wired communication protocols. Although it may be typical to utilize wireless LAN, Bluetooth, and/or HDMI protocols for multimedia or IoT content sharing, streaming, and transfer between the CSB and various electronic devices in the multiple device home or office environment, the CSB may also utilize cellular, satellite, Internet-based cloud networks, broadband, and/or other wide-area network (WAN) services for multimedia or IoT data cast and sling operations in some embodiments of the invention.

Figure 5:
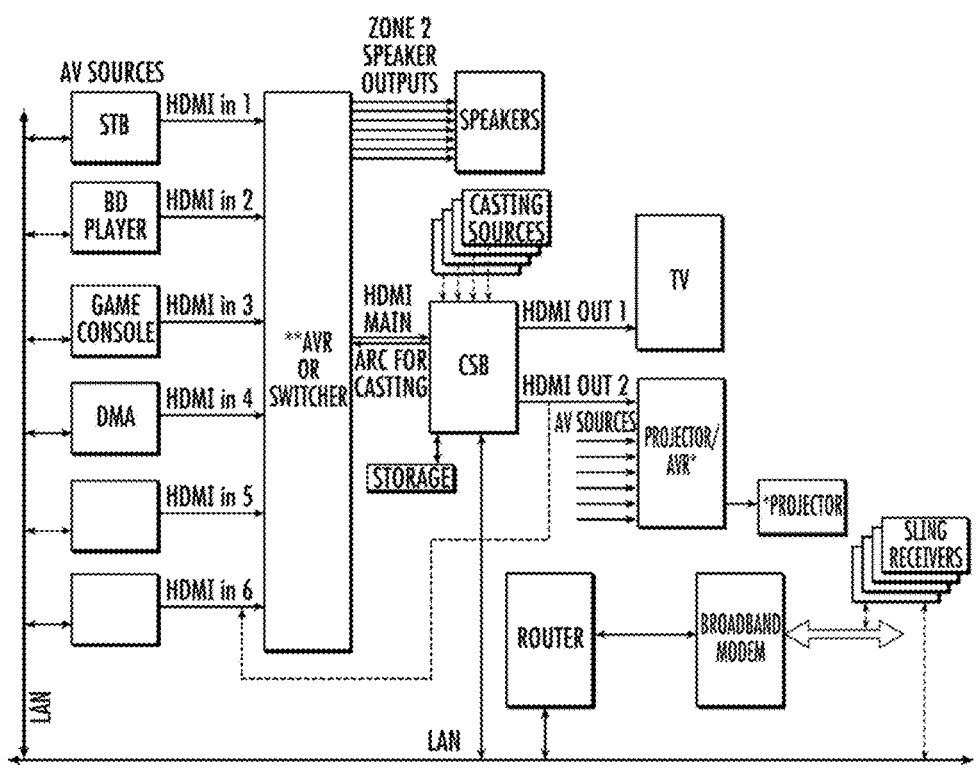
FIG. 5 shows an embodiment of a multiple device ecosystem with a novel cast-sling box (CSB), in accordance with an embodiment of the invention.

FIG. 5 shows an example of a multiple device ecosystem (500) with a novel cast-sling box (CSB), in accordance with an embodiment of the invention. In a preferred embodiment of the invention, the CSB can connect to a broadband data network via a home or office LAN, and is preferably configured by a designated administrator. The CSB is capable of seamlessly connecting or disconnecting to a plurality of cast command-initiating devices, sling command-initiating devices, and other electronic devices (e.g. IoT devices, TV set-top boxes, Blu-ray/DVD players, game consoles, etc.) that receive and process cast or sling commands. Some electronic devices may also be connected to the CSB via a wide-area network, such as the Internet. Unless a registration account is terminated by the administrator, users are able to walk into a room, an office space, or another place with multiple devices, and immediately start casting or slinging upon issuing a cast or sling command with their registered electronic devices.

Furthermore, in some embodiments of the invention, the CSB is operatively connected to IoT (Internet of Things) devices, which can be controlled by an authorized user device. For example, an IoT-enabled lamp in a room or an office space can be turned on or off by a user's smart phone that executes a user interface application for the CSB and/or for IoT management, as long as the user's smart phone is already registered and permitted to control the IoT-enabled lamp. In addition, the user interface application for the CSB and/or for IoT management may be configured to integrate a plurality of IoT device-specific applications into one combined user interface for controlling the plurality of IoT devices.

Preferably, the seamless interoperability of multiple connected devices is at least in part provided by the CSB that accommodates immediate and automated in-range device connections and disconnections, which automatically occur when a particular device is within a defined range (e.g. 200 ft, 50 ft, 10 ft, etc.) for data communication, similar to range-based automatic device connection schemes provided by Bluetooth and WiFi LAN protocols. The automated device detection, connection, and disconnection may require proximity-based CSB detection schemes. For example, a cast or sling command-initiating device may be configured to determine the nearest CSB to its current location and automatically connect to that nearest CSB, if there are a multiple number of CSB's within an automated device connection range. Alternatively, the cast or sling command-initiating device may connect to a particular CSB designated by a user in a user connection preferences setting, regardless of other CSB's that may be also present in the data access range.

Moreover, in some embodiments of the invention, choosing particular communication methods and/or protocols for device connections and multimedia or IoT content transfers among one or more CSB's and other electronic devices can be based on a current level or a targeted level of power consumption. For example, if a mobile device (e.g. a smart phone, a tablet computer, a smart watch, etc.) connected to a CSB currently has a low battery level, one or more application programs executed in the CSB and/or the mobile device may determine that a communication method should be switched from a low-compression or high-bandwidth protocol to a high compression protocol via a wireless LAN to reduce battery consumption in the mobile device. Preferably, the transition between one communication method and/or protocol to another is uninterrupted and seamless, at least from the user's perspective.

Similarly, if the power consumption settings for the mobile device and/or one or more CSB's are configured to be in a "power conserve" mode, a communication method that consumes the least amount of electrical power for executing a particular communication task may be automatically chosen by the one or more application programs executed in the mobile device and the one or more CSB's. In contrast, if the power consumption settings for the mobile device and/or the one or more CSB's are configured to be in a "maximum performance quality" mode, a communication method that provides the highest quality multimedia or IoT data transfer may be automatically chosen by the one or more application programs executed in the mobile device and the one or more CSB's, even if the chosen communication method consumes high amounts of electrical power.

Furthermore, a device that has not been previously registered by the CSB may be required to go through an initial registration process. The initial registration process may be introduced as part of a setup wizard in the CSB and also in a client application (e.g. a mobile app or a PC app) executed on the device. In the preferred embodiment, device registrations to the CSB are achieved by the CSB creating its own private network within an available home or office broadband data network, which allows a user device to switch over to the CSB's private network to register and establish the user device on the CSB's private network. Devices that are not authorized to be registered by a CSB and/or network administrator, a security firewall, or another security-controlling entity cannot access a LAN and/or a WAN connected to the CSB. Furthermore, even if a particular device is registered with the CSB, the security-controlling entity (e.g. the CSB and/or network administrator, the security firewall, etc.) may not authorize the particular device to access a home/office network or a broader network outside a localized and/or private network defined for the CSB-related communication.

Furthermore, in the preferred embodiment, a quality of service (QoS) policy may be incorporated into the CSB that allows the CSB and a connected device to the CSB to optimize types of dynamically-switchable data communication protocols for video, audio, and/or graphics quality for sling and cast operations, based on a current line of sightedness or distance between the CSB and the connected device. For example, the connected device may receive a slinged-in multimedia or IoT content via the CSB using an uncompressed wireless HDMI protocol when there is a direct line-of-sightedness (LoS) at a close distance between the CSB and the connected device. Typically, the uncompressed wireless HDMI protocol can provide a higher-quality multimedia playback experience at the expense of requiring more bandwidth and line-of-sightedness. If the connected device leaves the LoS range as the user is still watching the slinged-in multimedia or IoT content played back on the connected device, then the CSB and the connected device can dynamically and uninterruptedly switch to a wireless LAN protocol, a cellular data protocol, or another communication protocol that supports non-line-of-sightedness (NLoS) and/or data compression to utilize available bandwidth in greater distances, even if the communication protocol switching compromises the multimedia image, video, and/or audio quality. Likewise, if the connected device comes back within the LoS range relative to the CSB, the QoS policy may dynamically and uninterruptedly switch back from a longer-range and compression-based protocol to the uncompressed wireless HDMI protocol. Preferably, in context of the current availability of network bandwidth and line-of-sightedness, the QoS policy is configured to support the highest possible multimedia video, audio, and/or graphics quality for sling or cast operations between communicating devices without interruption, even when they are moving closer to or away from the CSB.

Preferably, the CSB is capable of providing interoperable compatibilities among a variety of electronics devices for multimedia or IoT content sharing, transfer, and playback in a home or office environment. Examples of electronic devices that can be connected to and intermediated by the CSB include, but are not limited to, a smart phone, a tablet computer, a notebook computer, a wearable electronic device, an optical disc player (e.g. a Blu-ray or DVD player), a cable TV or satellite TV set-top box, a game console, an audio system, a large display panel, and a conventional media storage and playback device (e.g. a time-shifting module integrated into or connected to a television).

Figure 6:
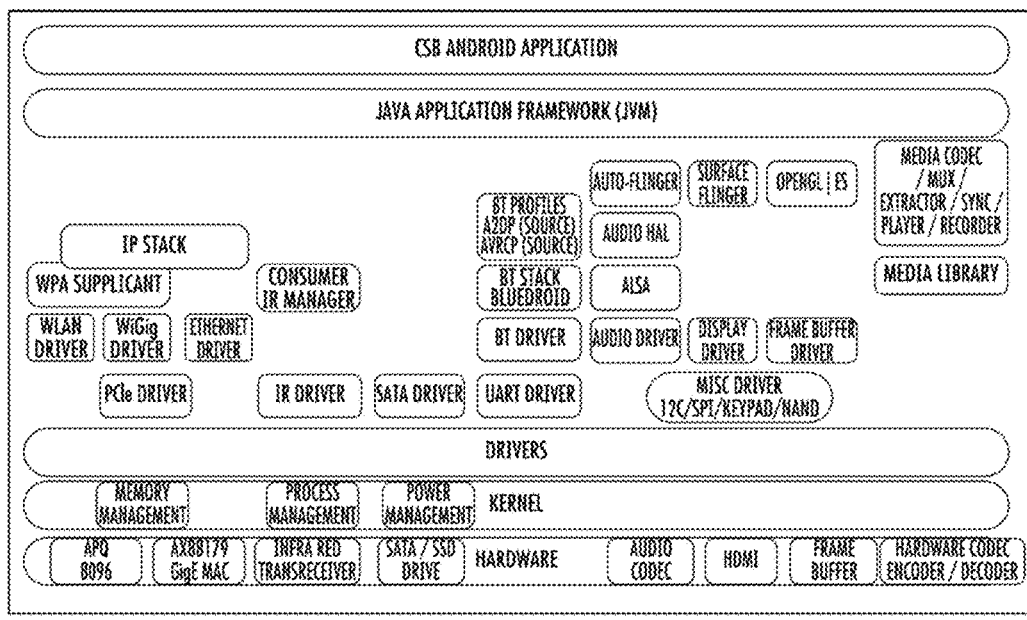
FIG. 6 shows a system software stack for a novel cast-sling box (CSB), in accordance with an embodiment of the invention.

FIG. 6 shows a system software stack (600) for a novel cast-sling box (CSB), in accordance with an embodiment of the invention. In this particular example, the system software stack (600) utilizes APQ8096 application processor-based hardware layer, kernels, and various communication drivers. This example also utilizes a Java Virtual Machine (JVM) framework and Android-compatible application layers. The effective result of creating this particular system software stack (600) is an Android application-compatible operating environment for a cast-sling box (CSB). In another embodiment, an iOS-specific system software stack, a Windows-specific system software stack, a Mac OS-specific software stack, or a Linux-based software stack may be created with corresponding underlying drivers, kernels, and hardware units. Yet in another embodiment, a special-purpose and proprietary system software stack may be created just for a particular cast-sling box (CSB) as part of a proprietary system software development kit (SDK) that may be specific to a brand or a set-top box manufacturer.

Figure 7:
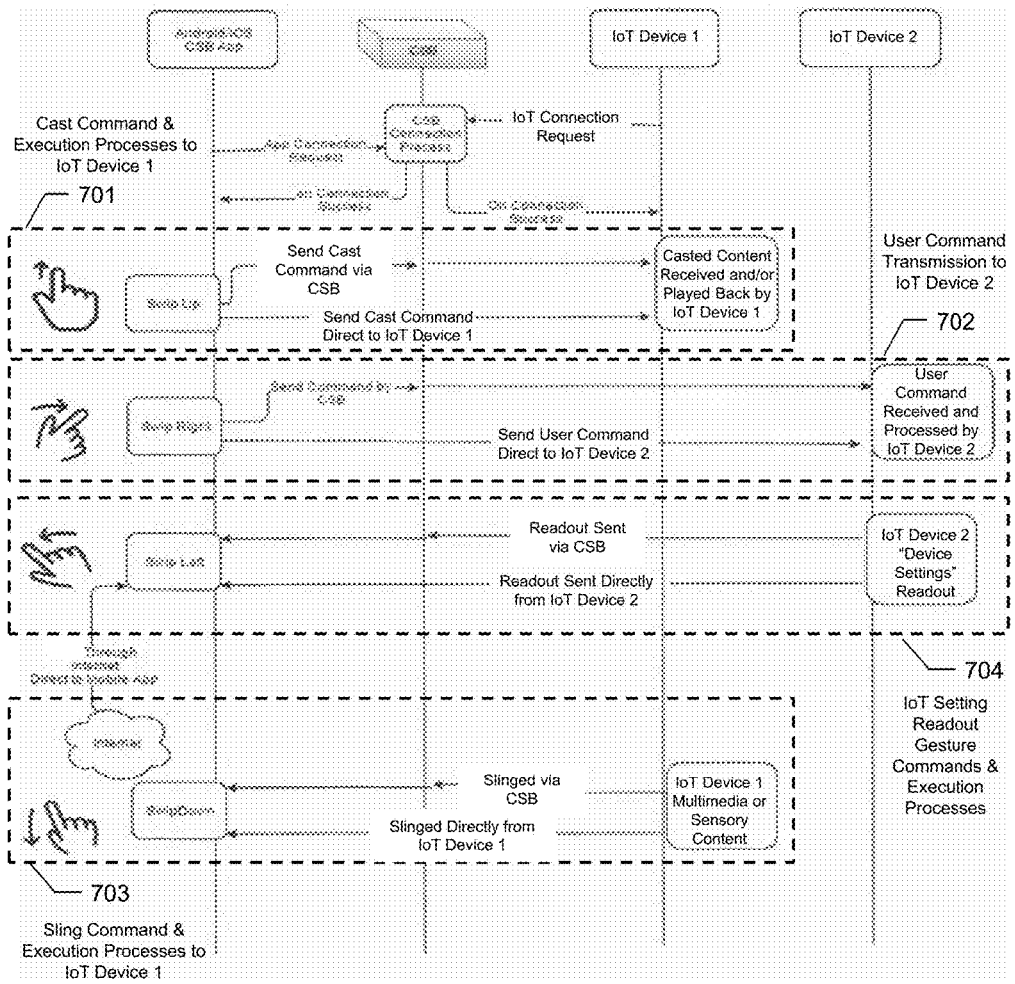
FIG. 7 shows a visual representation of sling and cast gesture commands and execution processes, in accordance with an embodiment of the invention.

FIG. 7 shows a visual representation (700) of sling and cast gesture commands and execution processes, in accordance with an embodiment of the invention. In this particular embodiment, sling and cast gesture commands are executed on an Android or iOS touch-screen device, such as a smart phone or a tablet computer. In another embodiment, similar or identical sling and cast gesture commands can be executed on another type of touch-screen electronic device that utilizes Windows, Linux, or another operating system. As shown in the visual representation (700) of this embodiment, a finger swipe-up gesture initiates a cast command, followed by execution processes (701) to IoT Device 1.

In a preferred embodiment of the invention, a user command to initiate "casting" of an audio/video (AV), graphical, photographic, multimedia, or IoT content from the touch-screen electronic device to a targeted device (i.e. IoT Device 1) is a finger swipe-up gesture command The swipe-up gesture may be particularly intuitive for a "casting" command that initiates multimedia or IoT content transmission to an IoT device, because a finger swipe-up motion mimics a physical motion of pushing, throwing, or sending an item from the touch-screen electronic device to the targeted device. In particular, the user may feel that the finger swipe-up gesture for multimedia/IoT data casting initiation is akin to "throwing" the content towards a targeted device (e.g. towards an IoT security camera, an IoT environmental sensor, an IoT kitchen appliance, etc.).

As shown in the cast command and execution processes (701) to IoT Device 1, the cast command may be sent first to the CSB, which in turn relays the cast command to IoT Device 1 Alternatively, the cast command may also be sent directly to IoT Device 1 without intermediation by the CSB, in case of a direct peer-to-peer connection between the touch-screen electronic device and IoT Device 1. If IoT Device 1 accepts the content casting request from the touch-screen electronic device, then data transmission and/or streaming from the touch-screen electronic device to IoT Device 1 is mediated, relayed, and/or transcoded for seamless interoperability and compatibility by the CSB.

In an alternate embodiment of the invention, this user command for casting contents may be performed by another finger swipe gesture command or another directional swipe command (e.g. a diagonal swipe, a circular swipe, or a finger swiping motion of another shape) instead. Furthermore, swipe commands or other user gesture commands can also be utilized for halting or terminating a casting or slinging process. For example, in some embodiments of the invention, a swipe-left gesture can be construed as a user command to terminate an ongoing casting process, while a swipe-right gesture can be construed as a user command to terminate an ongoing slinging process.

In some embodiments, extra user input variables, such as magnitudes of speed and/or pressure during a finger swipe, can also be utilized to define and determine a casting gesture command Defining a cast-initiating command with extra user input variables may be particularly useful, if simple directional swipe commands are already universally utilized for other purposes at the operating system level. Furthermore, for some embodiments of the invention, transparent user interfaces may be utilized to accommodate finger-move gestures between contents, which may also create an effect of a disintegrating breadcrumb trail.

In some embodiments of the invention, gyroscopic accelerometer sensing may be utilized to initiate a casting command For example, a "throwing" motion or forward motion from a cast command-initiating device towards a targeted IoT device can be quantified with a gyroscopic accelerometer integrated in the cast command-initiating device to determine a "cast vector." In such embodiments, the cast vector defines the direction and the magnitude of the user's accelerative motion that can be measured and analyzed to initiate a cast command to the targeted IoT device.

Moreover, in some embodiments of the invention, "air gestures," or non-physical-contact-based user gestures that are typically sensed and detected by visual and/or ultrasonic sensors, may also be supported by a cast command-initiating device to measure, determine, and initiate a casting command A preferred air gesture in one embodiment of the invention may be a "throwing" motion or a "push" motion near the cast command-initiating device towards a cast-targeted device. Yet in some embodiments of the invention, voice commands may be utilized to initiate a casting command A clear voice command, such as ". . . Cast Content A to Target Device B . . . , " may be issued by a user, which can be interpreted by the cast command-initiating device and converted into electrical signals for a specific cast command to a targeted device.

The "cast" commands may be transmitted directly to a targeted IoT device, or indirectly to the targeted IoT device via an intermediary unit, such as the cast-sling box (CSB) as shown in FIG. 7. In case of user-triggered cast commands and execution processes (701) for the embodiment as shown in FIG. 7, a user's gesture command (e.g. a finger swipe-up, a gyro accelerometer-sensed gesture for a cast command vector, etc.) is first interpreted by a multimedia or IoT data casting and slinging command user interface application, which is executed on the Android or iOS touch-screen device. Then, the multimedia or IoT data casting and slinging command user interface application determines the user's gesture command (e.g. the finger swipe-up) as a cast command, if there is a correct match in a library of known gestures. Subsequently, a corresponding electronic signal to initiate the multimedia or IoT data casting is transmitted to the targeted IoT device either directly to the targeted IoT device, or indirectly to the targeted IoT device via an intermediary set-top box, such as the CSB.

The targeted IoT device may incorporate an authorization and permissions control to allow or prevent multimedia or IoT data casting on the targeted IoT device, wherein the casting involves display, playback, or recording of a multimedia or IoT content transmitted from the Android or iOS touch-screen device. In addition, in some embodiments of the invention, administrative rights may supersede or override user controls or user priorities.

Furthermore, in the embodiment of the invention as shown in FIG. 7, the targeted IoT device (e.g. IoT Device 1, IoT Device 2) is typically selected by the user before the user issues a cast-initiating gesture command. Alternatively, a targeted IoT device may be automatically selected or determined by the multimedia casting and slinging command user interface application, or by the cast-sling box based on device proximity, user casting target preferences settings, or another casting target-determining algorithms.

In the preferred embodiment of the invention, the multimedia casting and slinging command user interface application executed on the touch-screen electronic device also provides gesture-based commands to initiate "slinging" (i.e. requesting, receiving, playing, and/or storing) of multimedia or IoT contents from a targeted IoT device (e.g. IoT Device 1). In the preferred embodiment, a user command to initiate "slinging" of IoT data (e.g. sensor readout values, device status information, device settings parameters, security camera footages, audio/video (AV) data, graphical data, photographic data, other multimedia contents, etc.) from the targeted IoT device is a finger swipe-down gesture command, as shown in FIG. 7.

The swipe-down gesture may be particularly intuitive for a "slinging" command that initiates multimedia or IoT content transfer-in request and reception from the targeted IoT device to the touch-screen electronic device because a finger swipe-down motion mimics a physical motion of "pulling-in" or receiving an item into the touch-screen electronic device. In particular, the user may feel that the finger swipe-down gesture for multimedia slinging initiation is akin to "bringing" the content towards the user from a targeted IoT device.

The targeted IoT device may be a peer-to-peer device configured to transmit the multimedia or IoT content directly to the touch-screen electronic device upon request from a user, who initiates the sling command and execution processes (703) via the finger swipe-down gesture command Alternatively, the targeted IoT device may be a device connected to a CSB, which is further connected to the touch-screen electronic device to accommodate the sling command and execution processes (703). Preferably, the CSB ensures compatibility and interoperability between the targeted IoT device and the touch-screen electronic device by performing data format analysis, and if necessary, by also performing data format conversions or transcoding before relaying the multimedia or IoT data between the targeted IoT device and the touch-screen electronic device.

Furthermore, in an alternate embodiment of the invention, the user command for initiating slinging of data may be performed by another finger swipe gesture or another directional swipe command (e.g. a diagonal swipe, a circular swipe, or a finger swiping motion of another shape) instead. In some embodiments, extra user input variables, such as magnitudes of speed and/or pressure during a finger swipe, can also be utilized to define and determine a slinging gesture command Defining a sling-initiating command with extra user input variables may be particularly useful, if simple directional swipe commands are already universally utilized for other purposes at the operating system level. Furthermore, for some embodiments of the invention, transparent user interfaces may be utilized to accommodate finger-move gestures between contents, which may also create an effect of a disintegrating breadcrumb trail.

In some embodiments of the invention, gyroscopic accelerometer sensing may be utilized to initiate a slinging command For example, a "pulling-in" motion from a targeted IoT device towards a sling content-receiving device can be quantified with a gyroscopic accelerometer integrated in a sling command-initiating device to determine a "sling vector." In such embodiments, the sling vector defines the direction and the magnitude of the user's accelerative motion that can be measured and analyzed to initiate a sling command to the targeted IoT device.

Moreover, in some embodiments of the invention, "air gestures," or non-physical-contact-based user gestures that are typically sensed and detected by visual and/or ultrasonic sensors, may also be supported by a sling command-initiating device to measure, determine, and initiate a slinging command A preferred air gesture in one embodiment of the invention may be a "pulling-in" motion from a sling-targeted device towards a sling content-receiving device, which can be the sling command-initiating device or another device. Yet in some embodiments of the invention, voice commands may be utilized to initiate a slinging command A clear voice command, such as ". . . Sling Content C from Target Device D to Device E . . . , " may be issued by a user, which can be interpreted by the sling command-initiating device and converted into electrical signals for a specific sling command to a targeted IoT device.

The preferred embodiment of the invention, as described above and as shown in FIG. 7, does not limit the scope of other embodiments of the invention, which may utilize different finger swipe patterns, arrangements, or other user gestures for correlating casting and slinging initiations with gesture-based user commands executed on the touch-screen electronic device. Furthermore, the touch-screen electronic device may be a portable electronic device (e.g. a smart phone, a tablet computer, a notebook computer, a portable gaming device, a smart watch, etc.), a wearable electronic device with an embedded display unit, or a display unit connected to a television, a computer server, a kiosk, or another less portable electronic system, which may be utilized in a connected home or office environment.

Continuing with the embodiment of the invention as shown in FIG. 7, in case of user-triggered sling commands and execution processes (703), a user's gesture command (e.g. a finger swipe-down, etc.) is first interpreted by a multimedia casting and slinging command user interface application, which is executed on the Android or iOS touch-screen device. Then, the multimedia casting and slinging command user interface application determines the user's gesture command as a sling initiation command, if there is a correct match in a library of known gestures. Subsequently, a corresponding electronic signal to initiate the multimedia or IoT data slinging is transmitted to the targeted IoT device either directly to the targeted IoT device, or indirectly to the targeted IoT device via an intermediary set-top box, such as the CSB.

The targeted IoT device may incorporate an authorization and permissions control to allow or prevent multimedia or IoT data slinging from the targeted IoT device to the Android or iOS touch-screen device, wherein the multimedia or IoT data slinging involves receiving a multimedia or IoT content sling request from the Android or iOS touch-screen device, allowing or denying the multimedia or IoT content sling request, and transmission of a requested multimedia or IoT content to the Android or iOS touch-screen device. In addition, in some embodiments of the invention, administrative rights may supersede or override user controls or user priorities.

Furthermore, in the embodiment of the invention as shown in FIG. 7, the targeted IoT device (e.g. IoT Device 1, IoT Device 2) and a particular multimedia or IoT content for slinging are typically selected by the user before the user issues a sling-initiating gesture command Alternatively, a targeted IoT device and/or a particular multimedia or IoT content for slinging may be automatically selected or determined by the multimedia casting and slinging command user interface application, or by the cast-sling box based on device proximity, user slinging target preferences settings, or another slinging target-determining algorithms (e.g. QoS, network type selection, DVR, on-screen, cast-to-sling, etc.).

Continuing with FIG. 7, in one embodiment of the invention, the user may send a device settings command to IoT Device 2 with a finger swipe-right gesture command on the touch-screen electronic device. This command may be sent directly to IoT Device 2, or instead be intermediated by the CSB, as shown in the "User Command Transmission to IoT Device 2" (702). The device settings command to an IoT device may be especially useful when the user is not only attempting to cast or sling IoT or multimedia data with the IoT Device, but is also attempting to change device settings, such as a target room temperature, a target refrigerator temperature, a motion sensor sensitivity level, a current camera angle of a security camera, etc.) in the IoT device through a remotely-issued device command from the touch-screen device. In another embodiment of the invention, another gesture command other than the swipe-right gesture may be utilized to initiate this process.

Furthermore, in one embodiment of the invention, the user may request and receive device settings information from IoT Device 2 with a finger swipe-left gesture command on the touch-screen electronic device. This command may be sent directly to IoT Device 2, or instead be intermediated by the CSB, as shown in the "IoT Setting Readout Gesture Commands and Execution Processes" (704). The device setting readout command to an IoT device may be especially useful when the user is not merely attempting to cast or sling IoT or multimedia data with the IoT Device, but is also attempting to retrieve device-specific settings or hardware configurations information (e.g. a current power usage level, a current battery level, a current memory level, a data storage availability level, etc.) from the IoT device through a remotely-issued device command from the touch-screen device. In another embodiment of the invention, another gesture command other than the swipe-left gesture may be utilized to initiate this process.

Moreover, in some embodiments of the invention, choosing particular communication methods and/or protocols for device connections and multimedia or IoT content transfers among one or more CSB's and other electronic devices for cast or sling-related operations can be based on a current level or a targeted level of power consumption. For example, if a mobile device (e.g. a smart phone, a tablet computer, a smart watch, etc.) connected to a CSB currently has a low battery level, one or more application programs executed in the CSB and/or the mobile device may determine that a communication method should be switched from a wireless HDMI protocol to a high compression protocol via a wireless LAN to reduce battery consumption in the mobile device. Preferably, the transition between one communication method and/or protocol to another is uninterrupted and seamless, at least from the user's perspective.

Similarly, if the power consumption settings for the mobile device and/or one or more CSB's are configured to be in a "power conserve" mode, a communication method that consumes the least amount of electrical power for executing a particular communication task may be automatically chosen by the one or more application programs executed in the mobile device and the one or more CSB's. In contrast, if the power consumption settings for the mobile device and/or the one or more CSB's are configured to be in a "maximum performance quality" mode, a communication method that provides the highest quality multimedia data transfer may be automatically chosen by the one or more application programs executed in the mobile device and the one or more CSB's, even if the chosen communication method consumes high amounts of electrical power.

Moreover, in some embodiments of the invention, network selection for transmission of multimedia or IoT contents after execution of casting or slinging commands may be intelligently determined based on at least one of inter-device proximity, network speed, power state or preferences, and QoS rules associated with transmitting and receiving devices. For example, an intelligent network selection algorithm executed by a CSB may select the highest-throughput and uncompressed communication protocol between a multimedia or IoT content-transmitting device and a multimedia or IoT content-receiving device, if the two devices are within line of sight (LoS). If the two devices are further apart and are not in line of sight, then the intelligent network selection algorithm may choose the next-best protocol that provides a relatively high data throughput under the current inter-device proximity. Similarly, the intelligent network selection algorithm may choose the highest possible network speed for accommodating casting or slinging of multimedia or IoT contents between the multimedia or IoT content-transmitting device and the multimedia or IoT content-receiving device.

Furthermore, in some instances, the intelligent network selection algorithm may select a communication protocol that provides best energy efficiency for inter-device communications among a plurality of available protocols. For example, if energy efficiency is configured as the user's important preference in the CSB, the intelligent network selection algorithm executed in the CSB may choose Bluetooth (IEEE 802.15 standard) for a particular cast operation instead of WiFi (IEEE 802.11 standard) or LTE (cellular network 4G), because Bluetooth may provide a higher energy efficiency than those offered by other available protocols. Moreover, the intelligent network selection algorithm may also incorporate one or more specific quality-of-service (QoS) rules associated with data-transmitting and data-receiving devices for cast and sling operations. In such instances, the QoS rules can take precedence over other available network selection methods.

Figure 8:
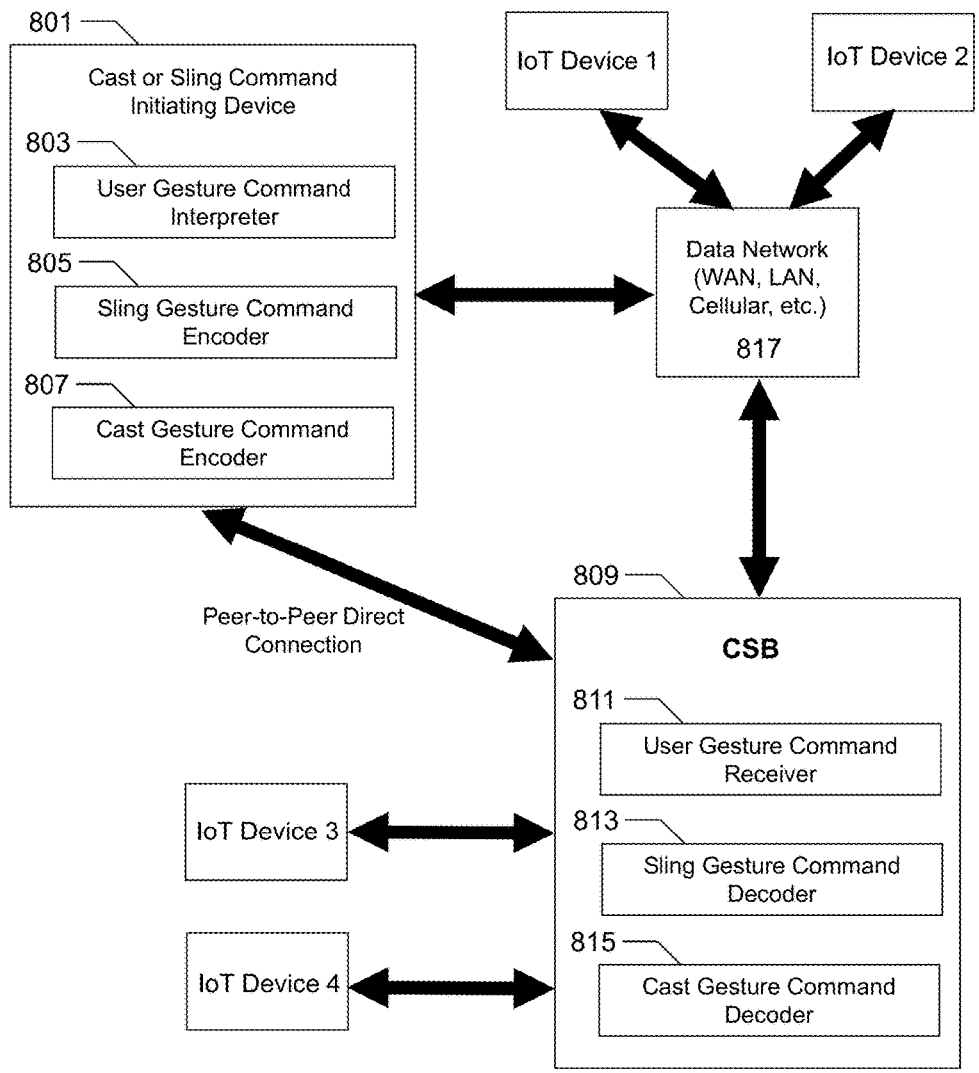
FIG. 8 shows an example of cast/sling command processing modules in a command-initiating device and a novel cast-sling box (CSB), which intermediates communication with a plurality of IoT devices, in accordance with an embodiment of the invention.

FIG. 8 shows an example (800) of cast/sling command processing modules in a command-initiating device and a command-receiving device (i.e. a cast-sling box), in accordance with an embodiment of the invention. In this example (800), a cast or sling command-initiating device (801) includes a user gesture command interpreter (803), a sling gesture command encoder (805), and a cast gesture command encoder (807). The cast or sling command-initiating device (801) may be a smart phone, a tablet computer, a wearable electronic device, a special-purpose cast-sling box remote controller with a touch screen, or another electronic device equipped with a touch screen display unit.

The cast or sling command-initiating device (801) incorporates a memory unit, a central processing unit (CPU), and/or an application processor unit (APU), which are configured to control or execute the user gesture command interpreter (807), the sling gesture command encoder (805), and the cast gesture command encoder (807). In a preferred embodiment of the invention, the user gesture command interpreter (803), the sling gesture command encoder (805), and the cast gesture command encoder (807) are part of a mobile application configured to work in an Android or iOS environment, or a desktop/notebook computer application configured to work in a Windows or Mac OS X environment. The multimedia casting and slinging command user interface application described in conjunction with FIG. 7 can be the mobile application or the desktop/notebook computer application that contain the user gesture command interpreter (803), the sling gesture command encoder (805), and the cast gesture command encoder (807).

In another embodiment, the user gesture command interpreter (803), the sling gesture command encoder (805), and the cast gesture command encoder (807) may be at least partially implemented in a semiconductor chip as an application-specific integrated circuit, a field-programmable gate array (FPGA), a graphical processing unit (GPU), a central processing unit (CPU), or another hardware logic component.

In the preferred embodiment of the invention, the user gesture command interpreter (803) incorporated in the cast or sling command-initiating device is configured to analyze a user's swiping gesture pattern, speed, and/or pressure on a touch screen. If the user's swiping motion matches a profile of a particular cast or sling command, then the user gesture command interpreter (803) instructs either the sling gesture command encoder (805) or the cast gesture command encoder (807) to generate a corresponding electronic signal and/or a data packet, which is subsequently transmitted to the CSB (809) via a P2P direct connection or via a data network (817), as shown in FIG. 8. In some embodiments, one or more CSB's may be connected between the cast or sling command-initiating device (801) and the cast or sling command-recipient devices (i.e. IoT Device 1, IoT Device 2) via the data network (817) to act as intermediary unit(s) for seamless device compatibility, data transcoding, format conversions, buffering, and/or recording. In other embodiments, the cast or sling command-initiating device (801) and one or more cast or sling command-recipient devices (e.g. IoT devices) are connected directly or via the data network (817) without any CSB involvement. Transmission of electronic signals and/or data packets may involve data compression, encryption, and video quality control enhancements and settings in the P2P direct connection or the data network (817) connection, based on user preferences, security requirements, and quality-of-service (QoS) parameters.

Furthermore, in the preferred embodiment of the invention, the CSB is configured to perform a "global-level" IoT device analysis, in which various sensory, hardware, and/or multimedia data from a plurality of IoT devices (e.g. IoT Device 1~IoT Device 4) in a home or office environment are holistically analyzed and presented to the end-user device by the CSB. For example, a current power consumption level of an activated air conditioner in a user's living room, a real-time video footage of the user's living room showing children resting on a sofa to watch TV, and an IoT electric utility meter indicating the user's current month power consumption can be holistically gathered and analyzed by the CSB to make intelligent power savings recommendations to the end-user device. In this example, the CSB may make an intelligent machine-generated recommendation to turn off the air conditioner in ten minutes because the show that the children is watching ends in ten minutes and the CSB recognizes that it is about bedtime for the children. The user, through a corresponding computerized desktop or mobile application on the end-user device, may approve or decline the CSB's recommendation to turn off the air conditioner in ten minutes. Depending on the user preferences settings (e.g. energy savings preferences, home/office security level settings, etc.) configured in the CSB, the CSB is able to generate intelligent action item recommendations to control and manage a variety of IoT devices directly or indirectly connected to the CSB.

Moreover, in the preferred embodiment of the invention, the CSB is also configured to prompt the end-user device to (i.e. manually or automatically) activate, display, deactivate, or terminate one or more mobile applications that are associated with control and/or management of IoT devices, as the user moves closer or away from the corresponding IoT devices in the home or office environment.

Continuing with the example (800) shown in FIG. 8, the cast or sling command-recipient devices may be one or more IoT devices (i.e. IoT Device 1~IoT Device 4), such as light bulbs, kitchen appliances, HVAC controllers, home security systems, door lock/unlock controllers, and environmental sensors. Furthermore, other cast or sling command-recipient devices, such as portable electronic devices, televisions, and audio systems, may also be operatively connected to the CSB (809) and the cast or sling command-initiating devices (801).

As shown in FIG. 8, the CSB (809) is a novel intermediary unit (e.g. a cast-sling box) configured to provide seamless interoperability among a plurality of cast or sling command-capable devices and/or IoT devices directly or indirectly connected to the cast or sling command-initiating device (801). In this embodiment of the invention, the CSB (809) includes a user gesture command receiver (811), a sling gesture command decoder (813), and a cast gesture command decoder (815).

In this embodiment of the invention, the CSB (809) is configured to relay the user's cast or sling command to one or more targeted IoT devices. The CSB (809) incorporates a memory unit, a central processing unit (CPU), and/or an application processor unit (APU), which are configured to control or execute the user gesture command receiver (811), the sling gesture command decoder (813), and the cast gesture command decoder (815). In a preferred embodiment of the invention, the user gesture command receiver (811), the sling gesture command decoder (813), and the cast gesture command decoder (815) are part of a mobile application configured to work in an Android or iOS environment, or a desktop/notebook computer application configured to work in a Windows or Mac OS X environment. The multimedia casting and slinging command user interface application described in conjunction with FIG. 7 can be the mobile application or the desktop/notebook computer application that contain the user gesture command receiver (811), the sling gesture command decoder (813), and the cast gesture command decoder (815). In another embodiment, the user gesture command receiver (811), the sling gesture command decoder (813), and the cast gesture command decoder (815) may be at least partially implemented in a semiconductor chip as an application-specific integrated circuit, a field-programmable gate array (FPGA), a graphical processing unit (GPU), a central processing unit (CPU), or another hardware logic component.

In the preferred embodiment of the invention, the user gesture command receiver (811) incorporated in the CSB (809) is configured to receive an electronic signal and/or a data packet containing an encoded sling command or an encoded cast command from the cast or sling command-initiating device (801). The user gesture command receiver (811) is also configured to identify, categorize, authenticate, decompress, and/or decrypt the electronic signal and/or the data packet as the encoded sling command or the encoded cast command If the electronic signal and/or the data packet are identified as the encoded sling command, then the electronic signal and/or the data packet are sent to the sling gesture command decoder (813), which decodes and further identifies a specific type of sling command (e.g. requesting transmission of a visual multimedia or IoT content, an audio content, or an IoT sensor data readout value from the sling command-recipient device, etc.).

On the other hand, if the electronic signal and/or the data packet are identified as the encoded cast command, then the electronic signal and/or the data packet are sent to the cast gesture command decoder (815), which decodes and further identifies a specific type of cast command (e.g. requesting receipt and processing of a visual multimedia, IoT content, or an audio content streaming from the cast command-initiating device, etc.).

In some embodiments of the invention, the sling gesture command decoder (813) and the cast gesture command decoder (815) may not need to exist as separate logical units for processing cast or sling commands originating from the command-initiating device, if the incoming electronic signal and/or the data packet already contain native device-level commands that the command-recipient device can readily understand and decipher without dedicated gesture command decoders. Furthermore, in some embodiments of the invention, cast or sling commands may be interpreted, transcoded, and/or decoded by an intermediary unit (e.g. a CSB) before any cast or sling-related commands reach a final destination IoT device for receiving and responding to such commands.

Figure 9:
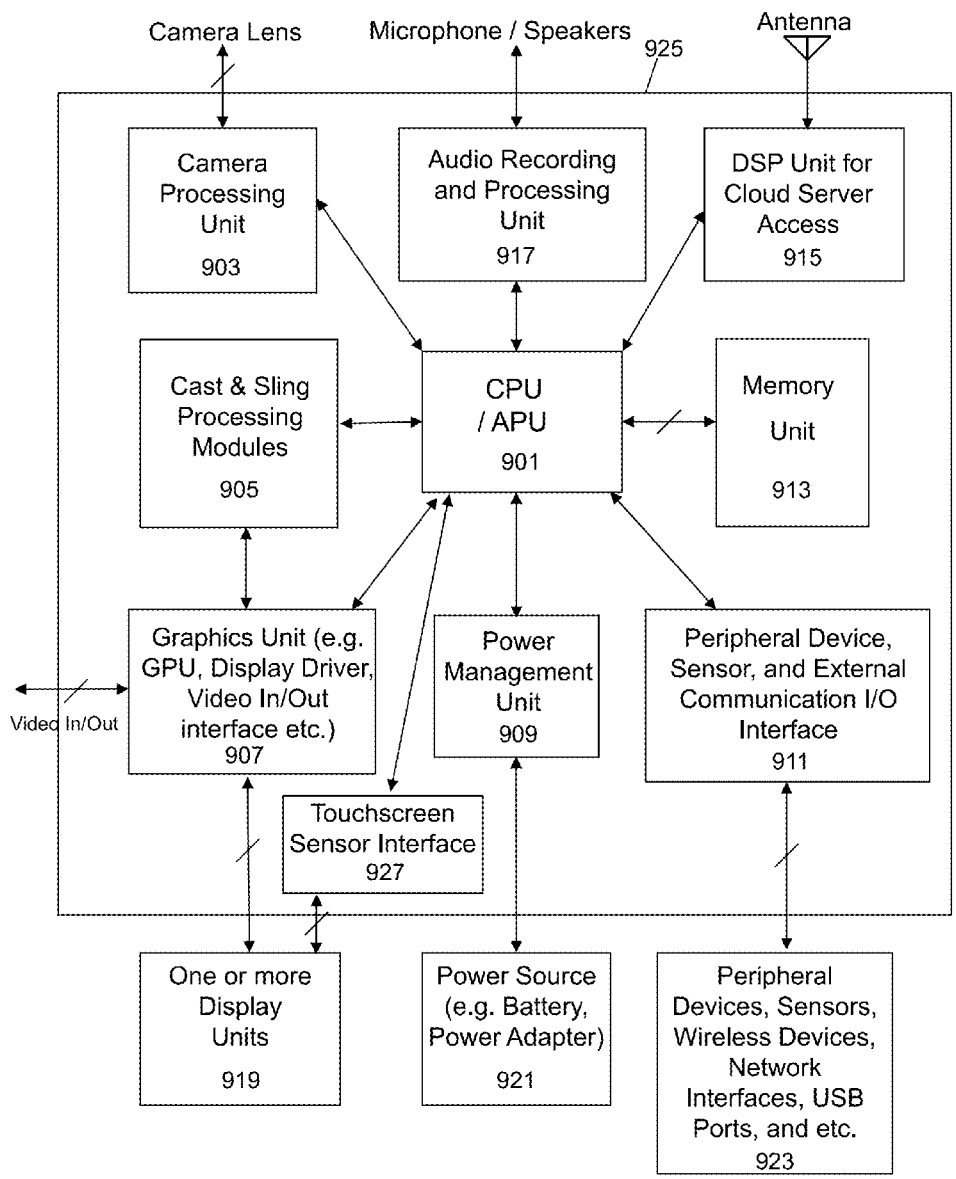
FIG. 9 shows a hardware block diagram example of a cast/sling command-initiating or cast/sling command-receiving device, in accordance with an embodiment of the invention.

FIG. 9 shows a hardware block diagram example (900) of an electronic system representing a cast/sling command-initiating or cast/sling command-receiving device, in accordance with an embodiment of the invention. The cast/sling command-initiating or command-receiving device may be an IoT device, a portable electronic device, a wearable electronic device, a computer display panel, a kiosk, a television, another electronic device with a touch-sensitive display panel, or a cast-sling box (CSB). In a preferred embodiment of the invention, the cast/sling command-initiating or command-receiving device contains one or more cast and sling processing modules, which have been described, for example, as various modules (i.e. elements 803, 805, 807, 811, 813, 815) in association with FIG. 8.

In a preferred embodiment of the invention, the block diagram of the cast/sling command-initiating or cast/sling command-receiving device incorporates a central processing unit (CPU) (901) or an application processor unit (APU), which is operatively connected to a memory and/or data storage unit (913), cast and sling processing modules (905), a camera processing unit (903) connected to a camera lens, a graphics unit (907) (e.g. a graphics processor, a display driver, and etc.), a power management unit (909), a peripheral device, sensor, and/or external communication I/O interface (911), a digital signal processing (DSP) unit for cloud server access (915), and an audio recording and processing unit (917), which is operatively connected to a microphone and one or more speakers. These logical units may be placed on a single printed circuit board (925) in one embodiment of the invention, or on a plurality of printed circuit boards in another embodiment of the invention.

In the preferred embodiment of the invention, the CPU/APU (901) is configured to control each logical unit operatively (i.e. directly or indirectly) connected to the CPU/APU (901). The memory and/or data storage unit (913) typically comprises volatile memory banks based on DRAM's. In some embodiments of the invention, the memory and/or data storage unit (913) may use non-volatile memory technologies such as SRAM's and/or Flash memory. The memory and/or data storage unit (913) is capable of storing programs, applications, and/or multimedia files that can be executed by the CPU/APU (901), the graphics unit (907), or another logical unit operatively connected to the memory and/or data storage unit (913). Furthermore, in the preferred embodiment of the invention, cast and sling processing modules (905) executed on the CPU/APU (901) and the memory and/or data storage unit (913) of the electronic system provide various cast/sling user gesture command interpretations, command encodings and decodings, multimedia or IoT transmission and receipt management, multimedia or IoT data recording, and multimedia or IoT data playback functionalities.

Moreover, in the preferred embodiment of the invention, the electronic system representing the cast/sling command-initiating or cast/sling command-receiving device is capable of performing data encryption, decryption, graphical rendering, and various multimedia format conversions and processing by utilizing the CPU/APU (901), the graphics unit (907), and/or another logical unit operatively connected to the memory and/or data storage unit (913).

In addition, in the preferred embodiment of the invention, a touchscreen sensor interface (927) may be connected to the CPU/APU (901) and one or more display units (919), which may embed capacitive or other types of touch sensors to detect user touch inputs and gestures. The touchscreen sensor interface (927) is configured to read and interpret touch sensor values transmitted from the one or more display units (919). In some embodiments of the invention, pressure sensing may provide an additional dimension of user control for sling and cast commands by interpreting various pressure levels of the user input. For example, a user may define opacity (i.e. transparency or translucency levels) of a viewing window by changing finger pressures on the user interface during multimedia or IoT content casting to a target device. In this example, a stronger finger pressure may turn the viewing window more opaque, while a lighter finger pressure may transition the viewing window to be more transparent. Furthermore, in some embodiments, an air gesture sensor may also be connected to the peripheral device, sensor, and/or external communication I/O interface (911) to support air gestures for cast or sling user commands. Moreover, the electronic system as illustrated in FIG. 9 may also provide data encryption, decryption, compression, decompression, and conversion based on security and QoS requirements of incoming or outgoing multimedia or IoT contents.

Continuing with the embodiment of the invention as shown in FIG. 9, any software and programs executed on the CPU/APU (901) and the memory and/or data storage unit (913) of the electronic system may be part of an operating system, or a separate application installed on the operating system of the electronic system. Furthermore, in this particular embodiment, the camera processing unit (903) is operatively connected to a camera lens on the electronic system, and is able to process real-time image-related data from the camera lens via the CPU/APU (901) and/or other logical units in the electronic system to provide a camera lens-captured multimedia video feed that can be utilized in a cast or sling process executed by the cast/sling command-initiating and cast/sling command receiving device. Moreover, the microphone operatively connected to the audio recording and processing unit (917) can produce live recorded audio content, which can also be utilized in a cast or sling process executed by the cast/sling command-initiating and cast/sling command receiving device.

Furthermore, as shown in FIG. 9, the digital signal processing (DSP) unit for cloud server access (915) is operatively connected to an radio frequency (RF) antenna. The DSP unit for cloud server access (915) is generally configured to receive and transmit multimedia or IoT data and/or voice signals wirelessly for a mobile communication device, a wireless audio system, a smart television, an electronic goggle, or another suitable electronic system. In addition, the electronic system representing the cast/sling command-initiating or cast/sling command-receiving device is also configured to communicate via a physical wired connection, such as an Ethernet cable or a fiber optic cable.

In addition, the power management unit (909) is operatively connected to a power supply unit and a power source (e.g. battery, power adapter) (921), and the power management unit (909) generally controls power supplied to the electronic system (i.e. the cast/sling command-initiating or cast/sling command-receiving device). Moreover, the peripheral device, sensor, and/or external communication I/O interface (911) as shown in FIG. 9 can be operatively connected to one or more peripheral devices, wireless devices (e.g. WiLAN, Bluetooth, SonosNet, etc.), USB ports, USB-enabled devices, and other external data communication media (923).

Continuing with the embodiment of the invention shown in FIG. 9, the graphics unit (907) in the system block diagram (900) for the electronic system comprises a graphics processor, a display driver, a dedicated graphics memory and/or data storage unit, and/or another graphics-related logical components. In general, the graphics unit (907) is able to process and communicate graphics-related data with the CPU/APU (901), the display driver, and/or the dedicated graphics memory and/or data storage unit. The graphics unit (907) is also operatively connected to one or more display units (919) and is operatively connected to video in/out ports, an HDMI interface, and/or another multimedia port. In addition, the CPU/APU (901) is operatively connected to the audio recording and processing unit (917) for generation of audio sound via wired or wireless speakers, wherein the audio sound may be at least partially "slinged" from a targeted IoT device after a sling command is executed for the electronic system. Moreover, the CPU/APU (901) operatively connected to the audio recording and processing unit (917) is configured to manage and control recording of aural information from the microphone operatively connected to the electronic system, which can subsequently be "casted" to a targeted IoT device for a localized audio content replay from the targeted IoT device (e.g. a home/office announcement system, a security system, etc.) after a cast command is fully executed.

Figure 10:
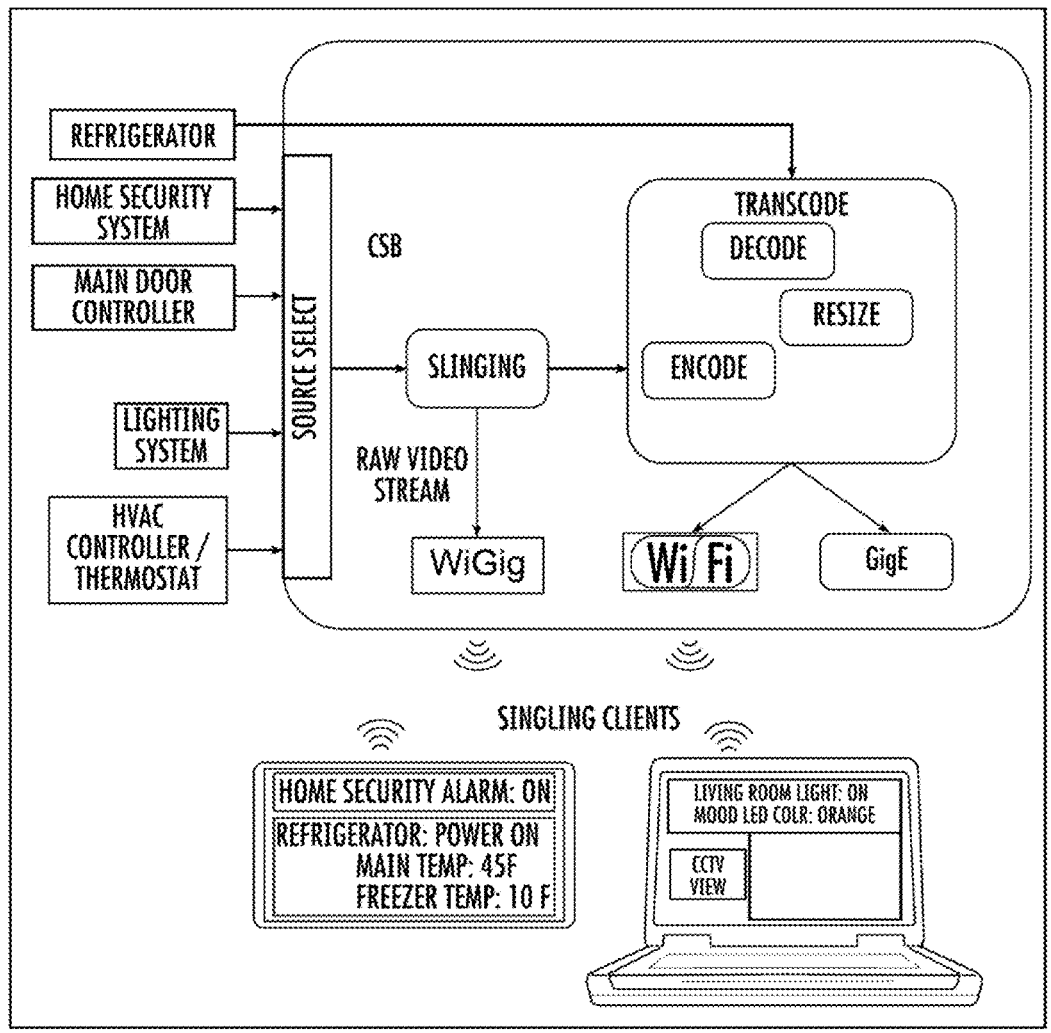
FIG. 10 shows an embodiment of "sling" command pathways for IoT device communication with end-user devices via a novel cast-sling box (CSB), in accordance with an embodiment of the invention.

FIG. 10 shows "sling" command pathways (1000) for IoT device communication with end-user devices via a novel cast-sling box (CSB) in an interoperable multiple device environment, in accordance with an embodiment of the invention. Preferably, each sling command is initiated with a user's swipe-down or another gesture command on a sling command-initiating device, as previously described in the Specification. A typical sling command pathway is started with a sling request from a sling command-initiating device (e.g. a portable electronic device such as a notebook computer, a smart phone, a tablet computer device, a portable gaming device, an electronic goggle, etc.) to the CSB, which further communicates with an end target IoT device in this example (e.g. a refrigerator, a home security system, a main door controller, a lighting system, a HVAC controller, a thermostat, etc.) that typically contains multimedia or IoT data that can be selected by the user and slinged (i.e. transferred, transmitted, re-directed, etc.) to the sling command-initiating device for playback, display, and/or localized storage.

As shown in FIG. 10, the CSB can be connected to an environmental sensor, a security camera, a home security system, and/or another Internet-of-Things (IoT) device to function as a home or office automation control box. With various sensor connections, the CSB can also provide proximity sensing for home or office security applications. A user device connected to the CSB can then readily "sling" (i.e. retrieve) environmental sensor or IoT device output values to the user device by issuing a sling command via the CSB. Likewise, in such embodiments of the invention, the user device can also transmit sensor control commands to the environmental sensor via the CSB, as described previously.

In the embodiment of the invention as shown in FIG. 10, a smart phone and a notebook computer are end-user devices that are configured to issue sling, cast, and/or device control commands to each IoT device connected to the CSB. The smart phone illustrated in FIG. 10 shows a user interface screenshot after slinging IoT data from the home security system and the refrigerator via the CSB. After a sling command from the smart phone is processed by the CSB to retrieve the IoT data from home security system and the refrigerator, the IoT data may be continuously streamed to the smart phone in real time or periodically updated on the user interface. Moreover, in one embodiment of the invention, the user interface executed on the smart phone is also configured to cast multimedia or IoT data to the home security system and/or the refrigerator, or transmit device control commands to the home security system and/or the refrigerator. In some instances, the user interface may also be configured to display, monitor, playback, render, or record a plurality of IoT data slinged from a plurality of IoT devices simultaneously.

Similarly, the notebook computer shown in FIG. 10 executes a user interface that displays a real-time video footage of the user's living room slinged from a security camera connected to the home security system, while simultaneously displaying lighting condition status information for the same living room slinged from the lighting system, independent of the security camera footage. Preferably, IoT data are relayed, transmitted, and/or streamed via the CSB that may selectively convert or transcode IoT data formats for seamless interoperability with the notebook computer.

Furthermore, in some embodiments of the invention, IoT devices and other electronic devices connected to the CSB can be seamlessly and automatically activated or deactivated by a sling or cast command-issuing device via the CSB's intermediary commands that can turn on or turn off the CSB-connected devices, depending on desirable states of each CSB-connected device for a particular user command or a current user device proximity to the CSB, IoT devices, and other electronic devices. For example, a user holding a command-issuing device and walking into a room equipped with a CSB connected to a plurality of electronic devices may trigger the CSB to activate a smart television and a plurality of IoT light bulbs in the room, if the user issues a command to turn on the IoT light bulbs via the CSB and also instructs the CSB to display the real-time power consumption of the IoT light bulbs on the smart television. Then, if the user walks out of the room, the CSB may automatically deactivate the plurality of IoT light bulbs and the smart TV to conserve energy.

Moreover, the CSB may also provide consolidation of portals for IoT device-related access and control. For example, the CSB can be configured to combine and convert a multiple number of conventional IoT device control user interfaces accessible by a computer or a mobile device into one coherent consolidated user interface that can be accessed by an end-user device. Furthermore, the CSB may also accommodate interrupt-driven events from IoT devices to display, inform, alert, or record the substance of such interrupt-driven events in the CSB or the end-user device operatively connected to the CSB. For example, if an IoT refrigerator detects one of its front doors to be ajar, the IoT refrigerator can send an alert signal as an interrupt-driven event to the CSB, which in turn transmits corresponding alert to the end-user device to sound an alarm and/or to display the alert on the end-user device. In addition, the CSB may also incorporate proximity sensing and proximity-based device interaction prioritization for the user, wherein IoT devices that are geographically in close proximity to the end-user device prompt one or more corresponding mobile applications to launch automatically on the end-user device to access and/or control the IoT data or multimedia contents.

This potential sling command pathway can be implemented with a matching pair of WiFi, WiGig, GigE transceivers, and/or wireless network routers. Alternatively, the potential sling command pathway can also be supported by peer-to-peer direct communication protocols, such as Bluetooth and HDMI standards. Furthermore, the potential sling command pathway shown in FIG. 10 may be wireless, physical-cable connected, or a combination of both wired and wireless configurations.

In this embodiment, end-target devices for a sling command is one or more IoT devices, which are intermediated by the CSB for seamless interoperability in slinging command executions between each sling command-initiating device and each end target device for slinging operations. Furthermore, the presence of CSB's in executing IoT sling commands may not be necessary in some embodiments, if devices are able to establish direct IoT data content transfer compatibility for casting and slinging activities.

Various embodiments of the present invention provide several advantages over conventional solutions for conducting, controlling, and managing multimedia or IoT data sharing and transfers.

One advantage of an embodiment of the present invention is uniquely providing a novel intermediary set-top box called a "cast-sling box" (CSB) that incorporates IoT data casting, slinging, transcoding, rendering, and recording capabilities for seamless interoperability of various electronic devices in a multiple device environment.

Furthermore, another advantage of an embodiment of the present invention is providing a set of intuitive user gesture commands executed on an electronic device that enable simplified and seamless interoperability and IoT data transfers among a plurality of electronic devices in a multiple device environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims presented herein.

What is claimed is:

1. An electronic system for real-time transfer and presentation of multiple Internet-of-Things (IoT) device information based on slinging and casting gesture commands, the electronic system comprising:
   an IoT device, which is not a display device and does not provide a display function within its casing, configured to sense, control, or record an environmental and physical variable, wherein the IoT device is a refrigerator, an indoor HVAC (heating, ventilating, and air conditioning) controller, a temperature sensor, a lighting controller, a door lock controller, a building security sensor, or a building window controller;
   a cast-sling box (CSB), which is a set-top box, containing a CPU or an APU, a memory unit, and at least one of a wireless LAN chipset, PCIe and PCM interfaces, a WiGig module connected to a PCIe interface, an audio codec connected to a USB interface, an IR blaster unit connected to a GPIO interface, an HDMI bridge unit for wireless HDMI input receivers, a voltage regulator, and a power supply, wherein the CSB performs a global-level IoT device analysis, in which environmental sensory and control readout data from various IoT devices are holistically analyzed and presented to a gesture-based multimedia casting and slinging command device by the CSB, and wherein the CSB also incorporates proximity sensing and proximity-based device interaction prioritizations between the gesture-based multimedia casting and slinging command device and the IoT device to automatically activate or terminate a mobile app for the IoT device or the IoT device itself, depending on a current distance between the gesture-based multimedia casting and slinging command device and the IoT device determined by the CSB;
   a cast and sling processing module executed and operated by the gesture-based multimedia casting and slinging command device or by the CSB, wherein the cast and sling processing module incorporates a user gesture interpreter, a user gesture command receiver, a sling gesture command encoder, and a cast gesture command encoder, wherein the user gesture interpreter determines a user's finger swipe gesture as an IoT device sling command involving an inbound IoT device control, content, or sensory value readout transfer from the IoT device to the gesture-based multimedia casting and slinging command device intermediated by the CSB, or as an IoT device cast command involving an outbound content or command transfer from the gesture-based multimedia casting and slinging command device to the IoT intermediated by the CSB;
   the sling gesture command encoder comprising circuitry configured to encode the IoT device sling command as an inbound IoT device control, content, or sensory value readout transfer request to the IoT device via the CSB for a localized control and playback at the gesture-based multimedia casting and slinging command device; and
   the cast gesture command encoder comprising circuitry configured to encode the IoT device cast command as an outbound content or command transfer request from the gesture-based multimedia casting and slinging command device to the IoT device via the CSB for a remote playback at the IoT device.

2. The electronic system of claim 1, further comprising a touchscreen sensor interface, a graphics unit, a touchscreen display unit, and a microprocessor in the gesture-based multimedia casting and slinging command device to receive, convert, and transmit the user's finger swipe gesture as electrical signals to the cast and sling processing module.

3. The electronic system of claim 1, wherein the user's finger swipe gesture is a swipe-down gesture for the IoT device sling command involving the inbound IoT device control, content, or sensory value readout transfer from the IoT device to the gesture-based multimedia casting and slinging command device intermediated by the CSB.

4. The electronic system of claim 1, wherein the user's finger swipe gesture is a swipe-up gesture for the IoT device cast command involving the outbound content or command transfer from the gesture-based multimedia casting and slinging command device to the IoT device intermediated by the CSB.

5. The electronic system of claim 1, wherein the gesture-based multimedia casting and slinging command device is a smart phone, a tablet computer, a notebook computer, an additional cast-sling box, or another electronic device that executes a user gesture interface application associated with the user gesture interpreter in the cast and sling processing module.

6. The electronic system of claim 1, wherein the gesture-based multimedia casting and slinging command device and the IoT device are intermediated by a cast-sling box (CSB), which transcodes or relays the IoT device sling command, the IoT device cast command, or multimedia data between the gesture-based multimedia casting and slinging command device and the IoT device.

7. The electronic system of claim 1, wherein the IoT device is a cast or sling command-recipient device and wherein the IoT device incorporates a user gesture command receiver, a sling gesture command decoder, and a cast gesture command decoder to decipher, comply with, or deny the IoT device sling command or the IoT device cast command from the gesture-based multimedia casting and slinging command device.

8. The electronic system of claim 1, wherein the IoT device, the CSB, and the gesture-based multimedia casting and slinging command device are configured to communicate data via at least one of a wireless local area network, a cellular network, a wide-area network, a satellite network, a wired network, or a peer-to-peer direct connection.

9. The electronic system of claim 1, wherein the IoT device is selected among a plurality of available IoT devices by a direct line of sight to the IoT device indicated by the user's finger swipe-down gesture for the IoT device sling command or the user's finger swipe-up gesture for the IoT device cast command on the gesture-based multimedia casting and slinging command device.

10. The electronic system of claim 5, wherein the user gesture interface application is an Android mobile app, an Apple mobile app, a PC-compatible application, or a MAC OS-compatible application.

11. The electronic system of claim 1, wherein the localized control and playback at the gesture-based multimedia casting and slinging command device, or the remote playback at the IoT device involves a transfer of at least one of IoT device control rights, sensor readout locations, and IoT device contents.

* * * * *